US012549892B2

(12) United States Patent
Lee

(10) Patent No.: US 12,549,892 B2
(45) Date of Patent: Feb. 10, 2026

(54) APPARATUS COMPRISING A VIBRATION APPARATUS AND A HOLE

(71) Applicant: LG DISPLAY CO., LTD., Seoul (KR)

(72) Inventor: JeongMan Lee, Gyeonggi-do (KR)

(73) Assignee: LG Display Co., Ltd (KR)

( * ) Notice: Subject to any disclaimer, the term of this patent is extended or adjusted under 35 U.S.C. 154(b) by 230 days.

(21) Appl. No.: 18/243,130

(22) Filed: Sep. 7, 2023

(65) Prior Publication Data

US 2024/0179457 A1 May 30, 2024

(30) Foreign Application Priority Data

Nov. 29, 2022 (KR) ........................ 10-2022-0162811

(51) Int. Cl.

| | |
|---|---|
| ***H04R 1/34*** | (2006.01) |
| ***H04R 1/02*** | (2006.01) |
| ***H04R 1/28*** | (2006.01) |
| ***H04R 17/00*** | (2006.01) |

(52) U.S. Cl.

CPC ............. *H04R 1/345* (2013.01); *H04R 1/023* (2013.01); *H04R 1/028* (2013.01); *H04R 1/2811* (2013.01); *H04R 17/00* (2013.01); *H04R 2499/15* (2013.01)

(58) Field of Classification Search

CPC ........ H04R 1/345; H04R 1/023; H04R 1/028; H04R 1/2811; H04R 17/00; H04R 2499/15

See application file for complete search history.

(56) References Cited

U.S. PATENT DOCUMENTS

2019/0349685 A1* 11/2019 Choi ................. G02F 1/133608
2021/0366456 A1* 11/2021 Jeong .................... G06F 1/1605

FOREIGN PATENT DOCUMENTS

KR 2022-0052748 A 4/2022

* cited by examiner

*Primary Examiner* — Mark Fischer
(74) *Attorney, Agent, or Firm* — Fish & Richardson P.C.

(57) ABSTRACT

An apparatus includes a vibration member, a vibration apparatus configured to vibrate the vibration member, and a supporting member disposed at a rear surface side of each of the vibration member and the vibration apparatus and including a hole region overlapping with the vibration apparatus. A size of the hole region is greater than a size of the vibration apparatus.

28 Claims, 12 Drawing Sheets

APPARATUS COMPRISING A VIBRATION APPARATUS AND A HOLE

CROSS-REFERENCE TO RELATED APPLICATION

This application claims the priority of Korean Patent Application No. 10-2022-0162811 filed on Nov. 29, 2022, which is hereby incorporated by reference in its entirety.

BACKGROUND

Field of the Disclosure

The present disclosure relates to an apparatus, and more particularly, to an apparatus for outputting sound.

Description of the Background

Apparatuses include a separate speaker or sound apparatus for providing sound. When a speaker is in a display apparatus, the speaker occupies a space; due to this, the design and spatial disposition of the display apparatus are limited.

A speaker applied to the apparatus may be, for example, an actuator, including a magnet and a coil. However, when the actuator is applied to the apparatus, a thickness thereof is large. Piezoelectric elements that enable thinness to be implemented are attracting much attention.

Sound, which is generated in sound apparatus or a speaker embedded in a display apparatus which is a type of apparatus, is output in a rearward direction or a lateral direction of the display apparatus instead of a forward direction of a display panel and thus does not travel toward a viewer or a user who is watching an image at a front region with respect to the display panel, and due to this, there is a problem where an immersion experience of the viewer watching the image is hindered.

SUMMARY

Accordingly, the present disclosure is directed to an apparatus for outputting sound that substantially obviates one or more of problems due to limitations and disadvantages described above.

More specifically, the present disclosure is provide an apparatus for outputting sound in a forward direction and a rearward direction thereof.

In addition, the present disclosure is to provide an apparatus for enhancing the clarity or sharpness of sound.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and aspects of the present disclosure, as embodied and broadly described herein, an apparatus includes a vibration member, a vibration apparatus configured to vibrate the vibration member, and a supporting member disposed at a rear surface side of each of the vibration member and the vibration apparatus and including a hole region overlapping with the vibration apparatus. A size of the hole region is greater than a size of the vibration apparatus.

In one or more aspects, an apparatus comprises a vibration member including a first region and a second region, a vibration apparatus including a first vibration apparatus configured to vibrate the first region and a second vibration apparatus configured to vibrate the second region, and a supporting member disposed at a rear surface side of each of the vibration member and the vibration apparatus and including a hole region overlapping with the vibration apparatus. The hole region comprises a first hole region having a size being greater than a size of the first vibration apparatus, and a second hole region having a size being greater than a size of the second vibration apparatus.

An apparatus according to one or more aspects of the present disclosure may output sound in a forward direction and a rearward direction thereof.

An apparatus according to one or more aspects of the present disclosure may enhance the clarity or sharpness of sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects of the disclosure and together with the description serve to explain principles of the disclosure.

In the Drawings

DETAILED DESCRIPTION

Figure 1:
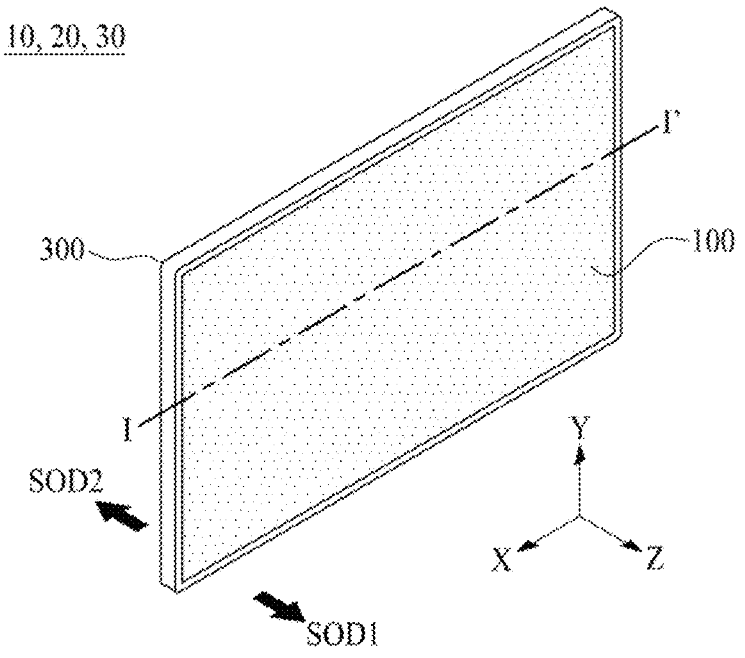
FIG. 1 is a perspective view illustrating an apparatus according to an aspect of the present disclosure.

Reference is now made in detail to aspects of the present disclosure, examples of which may be illustrated in the accompanying drawings. In the following description, where a detailed description of relevant known functions or configurations may unnecessarily obscure aspects of the present disclosure, a detailed description of such known functions or configurations may be omitted for brevity. The progression of processing steps and/or operations described is an example, and the sequence of steps and/or operations is not limited to that set forth herein and may be changed, with the exception of steps and/or operations necessarily occurring in a particular order.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

The shapes, dimensions, areas, ratios, angles, numbers, and the like disclosed in the drawings for describing aspects of the present disclosure, are merely an example, and thus, the present disclosure is not limited to the illustrated details. Like reference numerals are refer to like elements throughout.

Throughout the drawings and the detailed description, unless otherwise described, the same drawing reference numerals should be understood to refer to the same elements, features, or structures. The sizes, lengths, and thicknesses of layers, regions and elements, and depiction thereof may be exaggerated for clarity, illustration, or convenience.

Where a term like "comprise," "have," "include," "contain," "constitute," "made up of," "formed of" or the like is used, one or more other elements may be added unless a term such as "only" or the like is used. The terms used in the present disclosure are merely used to describe particular aspects and are not intended to limit the scope of the present disclosure. The terms used herein are merely used to describe example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship where the positional relationship between two parts is described, for example, using "on," "over," "under," "above," "below," "beneath," "near," "close to," "adjacent to," "beside," "next to," "on a side of" or the like, one or more other parts may be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," "next to" or "on a side of" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, where the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It will be understood that, although the term "first," "second," or the like may be used herein to describe various elements, these elements should not be limited by these terms, for example, to any particular order, precedence, or number of elements. These terms are only used to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element or layer is described as "connected," "coupled," "attached," or "adhered" to another element or layer, the element or layer may not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer may not only directly contact, overlap, or the like with another element or layer, but also indirectly contact, overlap, or the like with another element or layer with one or more intervening elements or layers disposed or interposed between the elements or layers, unless otherwise specified.

The terms such as a "line" or "direction" should not be interpreted only based on a geometrical relationship in which the respective lines or directions are parallel or perpendicular to each other. Such terms may mean a wider range of lines or directions within which the components of the present disclosure may operate functionally.

The term "at least one" should be understood as including any and all combinations of one or more of the associated listed items. For example, the meaning of "at least one of a first item, a second item, and a third item" encompasses the combination of all three listed items, combinations of any two the first item, the second item, and the third item, as well as any individual item, the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any combination of two of A, B, and C; and all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

Features of various aspects of the present disclosure may be partially or wholly coupled to or combined with each other, and may be operated, linked, or driven together in various ways. Aspects of the present disclosure may be carried out independently from each other, or may be carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness. Thus, aspects of the present disclosure are not limited to a scale, dimension, size, or thickness illustrated in the drawings.

Figure 2:
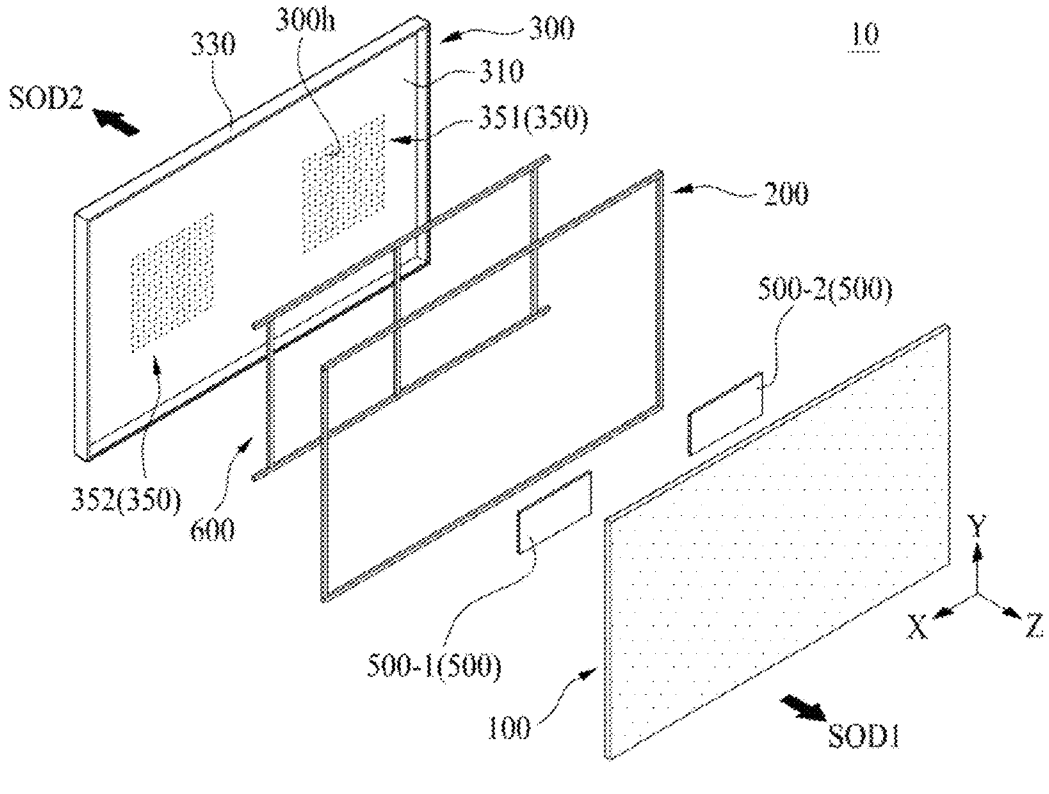
FIG. 2 is an exploded perspective view illustrating an apparatus according to an aspect of the present disclosure.

FIG. 1 is a perspective view illustrating an apparatus according to an aspect of the present disclosure. FIG. 2 is an exploded perspective view illustrating an apparatus according to an aspect of the present disclosure. FIG. 2 is a cross-sectional view taken along line I-I' illustrated in FIG. 1 according to an aspect of the present disclosure.

Figure 3:
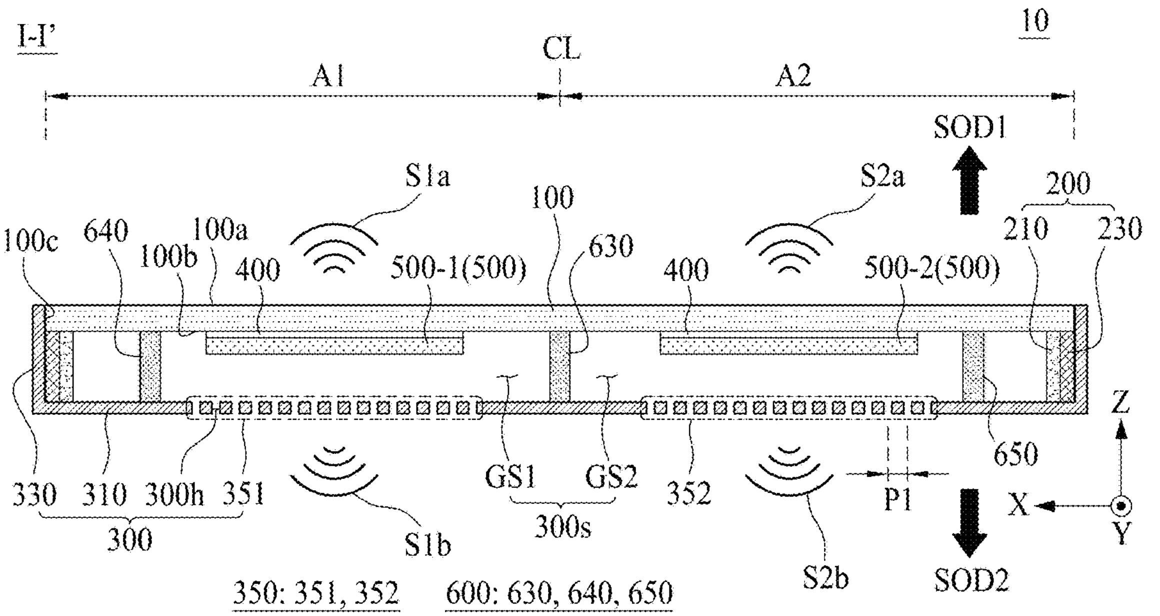
FIG. 3 is a cross-sectional view taken along line I-I' illustrated in FIG. 1 according to an aspect of the present disclosure.

With reference to FIGS. 1 to 3, an apparatus 100 according to an aspect (or a first aspect) of the present disclosure may implement or realize sound apparatus, sound output apparatus, a vibration apparatus, a vibration generating apparatus, sound bar, sound system, sound apparatus for electronic apparatuses, sound apparatus for displays, sound apparatus for vehicular apparatuses, or sound bar for vehicular apparatuses, or the like. For example, a vehicular apparatus may include one or more seats and one or more glass windows. For example, the vehicular apparatus may include a vehicle, a train, a ship, or an aircraft, but aspects of the present disclosure are not limited thereto. Further, the apparatus 100 may implement or realize an analog signage or a digital signage, or the like such as an advertising signboard, a poster, or a noticeboard, or the like.

The apparatus 10 according to an aspect of the present disclosure may be a display apparatus which includes a plurality of pixels, but aspects of the present disclosure are not limited thereto.

The display apparatus may include a display panel, which includes a plurality of pixels for configuring a black/white or a color image, and a driver configured to drive the display panel. The pixel may be a subpixel which configures one of a plurality of colors implementing a color image. The apparatus according to an aspect of the present disclosure may include a set electronic apparatus or a set device (or a set apparatus) such as notebook computers, televisions (TVs), computer monitors, equipment apparatuses including an automotive apparatus or another type apparatus for vehicles, or mobile electronic apparatuses such as smartphones or electronic pads, which is a complete product (or a final product) including a display panel such as a liquid crystal display panel or an organic light emitting display panel, or the like.

The apparatus 10 according to an aspect of the present disclosure may include a vibration member 100, a supporting member 300, and a vibration apparatus 500.

The vibration member 100 may generate a vibration or may output sound (or sound wave), based on a displacement (or driving or vibration) of the vibration apparatus 500. The vibration member 100 may be a vibration object, a display member, a display panel, a signage panel, a passive vibration plate, a front member, a rear member, a vibration panel, sound panel, a passive vibration panel, sound output plate, sound vibration plate, or an image screen, or the like, but aspects of the present disclosure are not limited thereto.

The vibration member 100 according to an aspect of the present disclosure may include a polygonal shape including a rectangular shape or a square shape, but aspects of the present disclosure are not limited thereto. The vibration member 100 may include a horizontal length parallel to a first direction X and a vertical length parallel to a second direction Y intersecting with the first direction X. For example, the vibration member 100 may include a horizontal length (or a widthwise length) parallel to the first direction X and a vertical length (or a lengthwise length) parallel to the second direction Y. For example, with respect to a same plane, the first direction X may be a first horizontal direction or a first horizontal length direction of the vibration member 100, and the second direction Y may be a second horizontal direction or a second horizontal length direction of the vibration member 100 which are orthogonal to the first direction X.

The vibration member 100 according to an aspect of the present disclosure may include a structure having totally a same thickness, but aspects of the present disclosure are not limited thereto. For example, the vibration member 100 may include a plate structure having totally a same thickness, but aspects of the present disclosure are not limited thereto. For example, the vibration member 100 may include one or more of a planar structure and a nonplanar structure.

According to an aspect of the present disclosure, the vibration member 100 may include a first surface 100*a*, a second surface 100*b*, and a plurality of lateral surfaces 100*c*.

In the vibration member 100, the first surface 100*a* may be a front surface, a forward surface, a top surface, or an upper surface. The second surface 100*b* may be a rear surface, a rearward surface, a backside surface, a bottom surface, or a lower surface. Each of the plurality of lateral surfaces 100*c* may be a side, an outer side, a sidewall, or an outer wall.

According to an aspect of the present disclosure, each of the first surface 100*a* and the second surface 100*b* of the vibration member 100 may include a planar structure. The vibration member 100 may include a structure having a totally uniform thickness, but aspects of the present disclosure are not limited thereto. For example, the vibration member 100 may include a plate structure having a totally uniform thickness, but aspects of the present disclosure are not limited thereto.

According to an aspect of the present disclosure, in the vibration member 100, each of the plurality of lateral surfaces 100*c* may include a vertical surface structure parallel to a third direction Z. The third direction Z may be a direction parallel to a thickness direction of the vibration member 100.

The vibration member 100 according to another aspect of the present disclosure may include a vibration plate which includes a metal material or a nonmetal material (or a composite nonmetal material) having a material characteristic suitable for outputting sound based on a vibration. The vibration member 100 may be configured to be transparent, translucent, or opaque. The metal material of the vibration member 100 may include any one or more materials of stainless steel, aluminum (Al), an Al alloy, a magnesium (Mg), a Mg alloy, and a magnesium-lithium (Mg—Li) alloy, but aspects of the present disclosure are not limited thereto. The nonmetal material (or the composite nonmetal material) of the vibration member 100 may include one or more material (or substance) of plastic, fiber, leather, wood, cloth, rubber, carbon, glass, and paper, but aspects of the present disclosure are not limited thereto. For example, the paper may be cone paper for speakers. For example, the cone paper may be a pulp or a foamed plastic, or the like, but aspects of the present disclosure are not limited thereto.

The vibration member 100 according to an aspect of the present disclosure may implement or realize a signage panel such as an analog signage or a digital signage, or the like such as an advertising signboard, a poster, or a noticeboard, or the like. For example, when the vibration member 100 implements the signage panel, the analog signage may include signage content such as a sentence, a picture, and a sign, or the like. The signage content may be disposed at the vibration member 100 to be visible or visual. For example, the signage content may be attached on one or more of the first surface 100*a* and the second surface 100*b* of the vibration member 100. For example, the signage content may be directly attached on one or more of the first surface 100*a* and the second surface 100*b* of the vibration member 100. For example, the signage content may be printed on a medium such as paper or the like, and the medium with the signage content printed thereon may be directly attached on one or more of the first surface 100*a* and the second surface 100*b* of the vibration member 100. For example, when the signage content is attached on the second surface 100*b* of the vibration member 100, the vibration member 100 may be configured as a transparent material.

The supporting member 300 may be configured or disposed at the second surface (or referred to as a rear surface) 100*b* of the vibration member 100. The supporting member 300 may be configured to cover or surround the second surface 100*b* of the vibration member 100.

The supporting member 300 according to an aspect of the present disclosure may include an internal space 300*s*. The supporting member 300 covers the second surface 100*b* of the vibration member 100 to form the internal space 300*s* between the supporting member 300 and the second surface 100*b* of the vibration member 100. For example, the supporting member 300 may include a box shape where one side (or one portion or an upper side or an upper portion) of the internal space 300*s* is opened. For example, the supporting member 300 may be a case, an outer case, a case member, a housing, a housing member, a cabinet, an enclosure, a sealing member, a sealing cap, a sealing box, or sound box, or the like, but aspects of the present disclosure are not limited thereto. For example, the internal space 300*s* of the supporting member 300 may be an accommodation space, a receiving space, a gap space, an air space, a vibration space, sound space, sound box, or a sealing space, or the like, but aspects of the present disclosure are not limited thereto.

The supporting member 300 according to an aspect of the present disclosure may include one or more of a metal material and a nonmetal material (or a composite nonmetal material), but aspects of the present disclosure are not limited thereto. For example, the supporting member 300 may include one or more materials of a metal material, plastic, and wood, but aspects of the present disclosure are not limited thereto. For example, the connection member 400 may configure as a metal material such as aluminum (Al) or a plastic material such as plastic or styrene material, but aspects of the present disclosure are not limited thereto. For example, the styrene material may be an ABS material. The ABS material may be acrylonitrile, butadiene, and styrene.

The supporting member 300 according to an aspect of the present disclosure may include a first supporting part 310 and a second supporting part 330.

The first supporting g part 310 may be disposed in parallel with the vibration member 100. The first supporting part 310 may be disposed to face the second surface 100*b* of the vibration member 100. The first supporting part 310 may be disposed to cover the second surface 100*b* of the vibration member 100. The first supporting part 310 may be spaced apart from the second surface 100*b* of the vibration member 100. For example, the first supporting part 310 may be spaced apart from the second surface 100*b* of the vibration member 100 with the internal space 300*s* formed therebetween. For example, the first supporting part 310 may be a floor part, a floor plate, a bottom part, a bottom plate, a supporting plate, a housing plate, a housing bottom part, or a housing floor part, or the like, but aspects of the present disclosure are not limited thereto.

The second supporting part 330 may be connected to a periphery portion of the first supporting part 310. For example, the second supporting part 330 may include a structure bent from the periphery portion of the first supporting part 310. For example, the second supporting part 330 may be parallel to the third direction Z, or may be inclined from the third direction Z. For example, the second supporting part 330 may be a lateral part, a sidewall, a supporting sidewall, a housing lateral surface, a housing sidewall, or the like, but aspects of the present disclosure are not limited thereto.

The second supporting part 330 may be configured to cover or surround the lateral surfaces 100*c* of the vibration member 100. Accordingly, the second supporting part 330 may configure an outermost lateral surface of the apparatus 10 or a lateral surface of a product.

The second supporting part 330 may be integrated into the first supporting part 310. For example, the first supporting part 310 and the second supporting part 330 may be integrated (or configured) as one body (or a single body), and thus, the internal space 300*s* surrounded by the second supporting part 330 may be provided over the first supporting part 310. Accordingly, the supporting member 300 may have a box shape which is formed by the first supporting part 310 and the second supporting part 330 so that one side (or one portion or an upper side or an upper portion) of the internal space 300*s* is opened.

The second supporting part 330 may have a single sidewall structure or a hemming structure. The hemming structure may be a structure where end portions of an arbitrary member are bent in a curve shape and overlap with each other or are spaced apart from each other in parallel. For example, to enhance a sense of beauty in design, the second supporting part 330 may be configured to include a bending sidewall which is bent from the second supporting member 330. For example, the bending sidewall may include a first bending sidewall, bent from one side (or one portion or an end) of the second supporting part 330, and a second bending sidewall bent from the first bending sidewall to a region between the first bending sidewall and an outer surface of the vibration member 100. The second bending sidewall may be spaced apart from an inner surface of the first bending sidewall to prevent (or minimize) contact with the inner surface of the first bending sidewall or external impact in a lateral direction from being transmitted to the lateral surfaces 100*c* of the vibration member 100. Therefore, the second bending sidewall may prevent (or minimize) the lateral surfaces 100*c* of the vibration member 100 from contacting an inner surface of the first bending sidewall or may prevent a lateral direction external impact from being transferred to the lateral surfaces 100*c* of the vibration member 100.

The apparatus 10 according to an aspect of the present disclosure may include a coupling member 200 between the vibration member 100 and the supporting member 300. The supporting member 300 may be coupled or connected to the vibration member 100 by the coupling member 200.

The supporting member 300 may be connected or coupled to a periphery portion of the vibration member 100 by the coupling member 200. The supporting member 300 may be connected or coupled to the second surface 100*b* of the vibration member 100 by the coupling member 200. For example, the supporting member 300 may be connected or coupled to a periphery portion of the second surface 100*b* of the vibration member 100 by the coupling member 200.

The coupling member 200 may be configured to minimize or prevent the transfer of a vibration of the vibration member 100 to the supporting member 300. The coupling member 200 may include a material characteristic suitable for blocking the vibration transferred from the vibration member 100 to the supporting member 300. For example, the coupling member 200 may include a material having elasticity. For example, the coupling member 200 may include a material having elasticity for vibration absorption (or impact absorption). The coupling member 200 according to an aspect of the present disclosure may be configured as polyurethane materials or polyolefin materials, but aspects of the present disclosure are not limited thereto. For example, the coupling member 200 may include one or more of an adhesive, a double-sided tape, a double-sided foam tape, a double-sided foam pad, and a double-sided cushion tape, but aspects of the present disclosure are not limited thereto.

The coupling member 200 according to an aspect of the present disclosure may prevent a physical contact (or friction) between the vibration member 100 and the second supporting part 330 of the supporting member 300, and thus, may prevent the occurrence of noise (or a noise sound) caused by the physical contact (or friction) between the vibration member 100 and the supporting member 300. For example, the coupling member 200 may be a buffer member, an elastic member, a damping member, a vibration absorption member, a vibration prevention member, or a vibration blocking member, but aspects of the present disclosure are not limited thereto.

The coupling member 200 according to another aspect of the present disclosure may be configured to minimize or prevent the transfer of a vibration of the vibration member 100 to the supporting member 300 and to decrease the reflection of sound wave which is generated and input based on a vibration of the vibration member 100.

The coupling member 200 according to another aspect of the present disclosure may include a first coupling member 210 and a second coupling member 230.

The first coupling member 210 may be disposed between the vibration member 100 and the supporting member 300. The first coupling member 210 may be disposed or coupled between a rear periphery portion of the vibration member 100 and a second supporting part 330 of the supporting member 300. For example, the first coupling member 210 may be disposed inward (or an inner portion) of the second coupling member 230. The first coupling member 210 may be configured to have hardness which is smaller than that of the second coupling member 230, for example, a modulus (or a Young's modulus). For example, the first coupling member 210 may include a double-sided polyurethane tape, a double-sided polyurethane foam tape, a double-sided sponge tape, or the like, but aspects of the present disclosure are not limited thereto.

The second coupling member 230 may be disposed between the vibration member 100 and the supporting member 300 to surround the first coupling member 210. The second coupling member 230 may be disposed or coupled between the rear periphery portion of the vibration member 100 and the second supporting part 330 of the supporting member 300 to surround the first coupling member 210. For example, the second coupling member 230 may be disposed outward (or an outer portion) from the first coupling member 210 and may be surrounded by the second supporting part 330 of the supporting member 300. The second coupling member 230 may be configured to have hardness which is greater than that of the first coupling member 210, for example, a modulus (or a Young's modulus). For example, the second coupling member 230 may include a double-sided polyolefin tape, a double-sided polyolefin foam tape, a double-sided acrylic tape, a double-sided acrylic foam tape, or the like, but aspects of the present disclosure are not limited thereto.

The coupling member 200 according to another aspect of the present disclosure may absorb sound which is generated and input based on a vibration of the vibration member 100 by the first coupling member 210 which is relatively soft and is disposed inward from the second coupling member 230 which is relatively stiff (or harder), and thus, a reflected sound (or a reflected wave) generated by being reflected from the coupling member 200 may be minimized. Accordingly, each of a highest sound pressure level and a lowest sound pressure level generated in a reproduction frequency band of sound generated based on a vibration of the vibration member 100 may be reduced, and thus, flatness of sound pressure level may be reduced.

The vibration apparatus 500 may be configured to vibrate the vibration member 100. The vibration apparatus 500 may vibrate the vibration member 100 to output a first sound S1a or a first haptic feedback in a forward direction (or first sound output direction) SOD1 of the vibration member 100. The vibration apparatus 500 may be disposed or configured at the vibration member 100. The vibration apparatus 500 may be configured to vibrate (or displace or drive) based on a driving signal (or an electrical signal or a voice signal) applied thereto to vibrate (or displace) the vibration member 100. For example, the vibration apparatus 500 may be an active vibration member, a vibration generator, a vibration structure, a vibrator, a vibration generating device, sound generator, sound device, sound element, sound generating structure, or sound generating device, but aspects of the present disclosure are not limited thereto.

The vibration apparatus 500 according to an aspect of the present disclosure may include a piezoelectric material or an electroactive material which have a piezoelectric characteristic. The vibration apparatus 500 may autonomously vibrate (or displace) based on a vibration (or displacement or driving) of the piezoelectric material based on a driving signal applied to the piezoelectric material, or may vibrate (or displace or drive) the vibration member 100 or the like. For example, the vibration apparatus 500 may alternately repeat contraction and/or expansion based on a piezoelectric effect (or a piezoelectric characteristic) to vibrate (or displace or drive). For example, the vibration apparatus 500 may vibrate (or displace or drive) in a third direction (or a vertical direction, or a thickness direction) Z as contraction and/or expansion are alternately repeated by an inverse piezoelectric effect.

The vibration apparatus 500 according to an aspect of the present disclosure may include a tetragonal shape which has a first length parallel to the first direction X and a second length parallel to the second direction Y. For example, the vibration apparatus 500 may include a tetragonal shape which has where the first length is greater than that of the second length. For example, the vibration apparatus 500 may include a tetragonal shape which has where the first length is twice (or two times) the second length, but aspects of the present disclosure are not limited thereto.

The vibration apparatus 500 according to an aspect of the present disclosure may be connected or coupled to the vibration member 100 by a connection member 400. For example, the vibration apparatus 500 may be connected to or supported by the second surface 100*b* of the vibration member 100 by the connection member 400, but aspects of the present disclosure are not limited thereto. For example, the connection member 400 may be a first connection member, an adhesive member, or a first adhesive member, but aspects of the present disclosure are not limited thereto.

The connection member 400 may be disposed between the vibration apparatus 500 and the vibration member 100 and may connect or couple the vibration apparatus 500 to the vibration member 100. For example, the vibration apparatus 500 may be connected or coupled to the second surface 100*b* of the vibration member 100 by the connection member 400, and thus, may be supported by or disposed at the second surface 100*b* of the vibration member 100.

The connection member 400 according to an aspect of the present disclosure may include an adhesive layer (or a tacky layer) which is good in attaching force or adhesive force. For example, the connection member 400 may be configures as a material including an adhesive layer which is good in attaching force or adhesive force, with respect to each of the vibration apparatus 500 and the second surface 100*b* of the vibration member 100. For example, the connection member 400 may include a foam pad, a double-sided tape, a double-sided foam pad, a double-sided foam tape, an adhesive, a double-sided adhesive tape, a double-sided adhesive foam tape, a tacky sheet, or the like, but aspects of the present disclosure are limited thereto. For example, when the connection member 400 includes the adhesive layer (or the tacky layer), the connection member 400 may include only an adhesive layer or a tacky layer without a base member such as a plastic material or the like.

The adhesive layer (or a tacky layer) of the connection member 400 according to an aspect of the present disclosure may include epoxy, acrylic, silicone, or urethane, but aspects of the present disclosure are limited thereto. The adhesive layer (or a tacky layer) of the connection member 400 according to another aspect of the present disclosure may include a pressure sensitive adhesive (PSA), an optically cleared adhesive (OCA), or an optically cleared resin (OCR), but aspects of the present disclosure are limited thereto. For example, the adhesive layer of the connection member 400 may include an acrylic-based a substance (or a material) having a characteristic where an adhesive force is relatively better and hardness is higher than the urethane material. Accordingly, a vibration of the vibration apparatus 500 may be transferred to the vibration member 100 well.

In the apparatus according to an aspect of the present disclosure, the vibration member 100 may include a first region A1 and a second region A2. For example, the second surface 100*b* of the vibration member 100 may include a first region (or a first rear region) A1 and a second region (or a second rear region) A2. For example, the first region A1 may be a left rear region, and the second region A2 may be a right rear region. The first region A1 and the second region A2 may be a left-right symmetrical with respect to a center line CL of the vibration member 100 based on the first direction X, but aspects of the present disclosure are not limited thereto. For example, the first region A1 and the second region A2 may be a left-right asymmetrical. For example, when the vibration member 100 is a display panel having a plurality of pixels, each of the first region A1 and the second region A2 may overlap with a display area of the display panel.

The apparatus 10 or the vibration apparatus 500 according to an aspect of the present disclosure may include a first vibration apparatus 500-1 and a second vibration apparatus 500-2.

The first vibration apparatus 500-1 may be disposed at the first region A1 of the vibration member 100. The first vibration apparatus 500-1 may be connected or coupled to the first region A1 of the vibration member 100 by the connection member 400, and thus, may be connected to or supported by the first region A1 of the vibration member 100. The first vibration apparatus 500-1 may be connected to or supported by the second surface 100*b* of the vibration member 100 overlapping with the first region A1 of the vibration member 100 by the connection member 400. For example, the first vibration apparatus 500-1 may be disposed close to a center or a periphery within the first region A1 of the vibration member 100 with respect to the first direction X. The first vibration apparatus 500-1 may vibrate the first region A1 of the vibration member 100, and thus, may generate a first sound S1a or a first haptic feedback in the first region A1 of the vibration member 100. For example, the first vibration apparatus 500-1 may directly vibrate the first region A1 of the vibration member 100, and thus, may generate the first sound S1a or the first haptic feedback in the first region A1 of the vibration member 100. For example, the first sound S1a may be a left sound.

The second vibration apparatus 500-2 may be disposed at the second region A2 of the vibration member 100. The second vibration apparatus 500-2 may be connected or coupled to the second region A2 of the vibration member 100 by the connection member 400, and thus, may be connected to or supported by the second region A2 of the vibration member 100. The second vibration apparatus 500-2 may be connected to or supported by the second surface 100*b* of the vibration member 100 overlapping with the second region A2 of the vibration member 100 by the connection member 400. For example, the second vibration apparatus 500-2 may be disposed close to a center or a periphery within the second region A2 of the vibration member 100 with respect to the first direction X. The second vibration apparatus 500-2 may vibrate the second region A2 of the vibration member 100, and thus, may generate a second sound S2a or a second haptic feedback in the second region A2 of the vibration member 100. For example, the second vibration apparatus 500-2 may directly vibrate the second region A2 of the vibration member 100, and thus, may generate the second sound S2a or the second haptic feedback in the second region A2 of the vibration member 100. For example, the second sound S2a may be a right sound.

The apparatus 100 or the supporting member 300 according to an aspect of the present disclosure may further include a plurality of holes 300*h*.

The plurality of holes 300*h* may be configured for decreasing an internal air pressure of the apparatus 10. For example, the plurality of holes 300*h* may be configured for reducing an air pressure of the internal space 300*s* of the apparatus 10 or an air pressure of the internal space 300*s* provided between the vibration member 100 and the supporting member 300.

The plurality of holes 300*h* may be configured at the supporting member 300. The plurality of holes 300*h* may be configured at a certain region or a partial region of the supporting member 300. The plurality of holes 300*h* may be formed to pass through or vertically pass through the supporting member 300. Therefore, the internal space 300*s* of the apparatus 10 or the internal space 300*s* provided between the vibration member 100 and the supporting member 300 may be connected or communicate with the outside by the plurality of holes 300*h*, and thus, an air pressure of the internal space 300*s* of the apparatus 10 or an air pressure of the internal space 300*s* provided between the vibration member 100 and the supporting member 300 may be reduced. For example, when the supporting member 300 is a housing, the internal space 300*s* surrounded by the vibration member 100 and the housing may be connected or communicate with an external space of the housing through the plurality of holes 300*h*.

The plurality of holes 300*h* may each be a path through which sound generated based on a vibration of the vibration member 100 (or the vibration apparatus 500) is output in a rearward direction (or a second sound output direction) of the apparatus 100 or the supporting member 300. The sound generated based on the vibration of the vibration member 100 (or the vibration apparatus 500) may be output in a forward direction SOD1 of the vibration member 100 and may be output in a rearward direction SOD2 of the apparatus 100 or the supporting member 300 through the plurality of holes 300*h*. For example, sound output in the forward direction SOD1 of the vibration member 100 may be a first sound (or a first forward sound) S1a and a second sound (or a second forward sound) S2a. For example, sound output in the rearward direction SOD2 of the apparatus 100 or the supporting member 300 may be a third sound (or a first rearward sound) S1b and a fourth sound (or a second rearward sound) S2b. Accordingly, the apparatus 10 according to an aspect of the present disclosure may output the sounds S1a, S2a, S1b, and S2b in the forward direction SOD1 and the rearward direction SOD2, respectively.

Each of the plurality of holes 300*h* may be configured at the supporting member 300 to overlap with the vibration apparatus 500. Each of the plurality of holes 300*h* may be configured at the first supporting part 310 of the supporting member 300 to overlap with the vibration apparatus 500. The plurality of holes 300*h* may be configured at a region, overlapping with the vibration apparatus 500, of a region of the first supporting part 310. The plurality of holes 300*h* may be formed to pass through or vertically pass through the first supporting portion 310 along a thickness direction of the supporting member 300 or a third direction Z.

The plurality of holes 300*h* may be configured at the supporting member 300 overlapping with each of the first region A1 and the second region A2 of the vibration member 100. The plurality of holes 300*h* may be configured at the first supporting part 310 of the supporting member 300 overlapping with each of the first region A1 and the second region A2 of the vibration member 100.

The plurality of holes 300*h* may be configured at the supporting member 300 to overlap with each of first and second vibration apparatuses 500-1 and 500-2 of the vibration apparatus 500. The plurality of holes 300*h* may be configured at the first supporting part 310 of the supporting member 300 to overlap with each of first and second vibration apparatuses 500-1 and 500-2 of the vibration apparatus 500. Outermost holes of the plurality of holes 300*h* may be spaced apart from an end (or a portion or a side or one side or one portion) of the vibration apparatus 500.

The plurality of holes 300*h* according to an aspect of the present disclosure may be configured to have a certain interval (or pitch or distance) P1 at the first supporting part 310 of the supporting member 300. The plurality of holes 300*h* may be configured to have the certain interval P1 along each of the first direction X and the second direction Y. The interval (or pitch or distance) P1 between the plurality of holes 300*h* may be a shortest distance or a distance between center portions of two adjacent holes 300*h*. The plurality of holes 300*h* may have the same size. A size (or a diameter) of each of the plurality of holes 300*h* may be smaller than the interval (or pitch or distance distance) P1 between the plurality of holes 300*h*.

Figure 4:
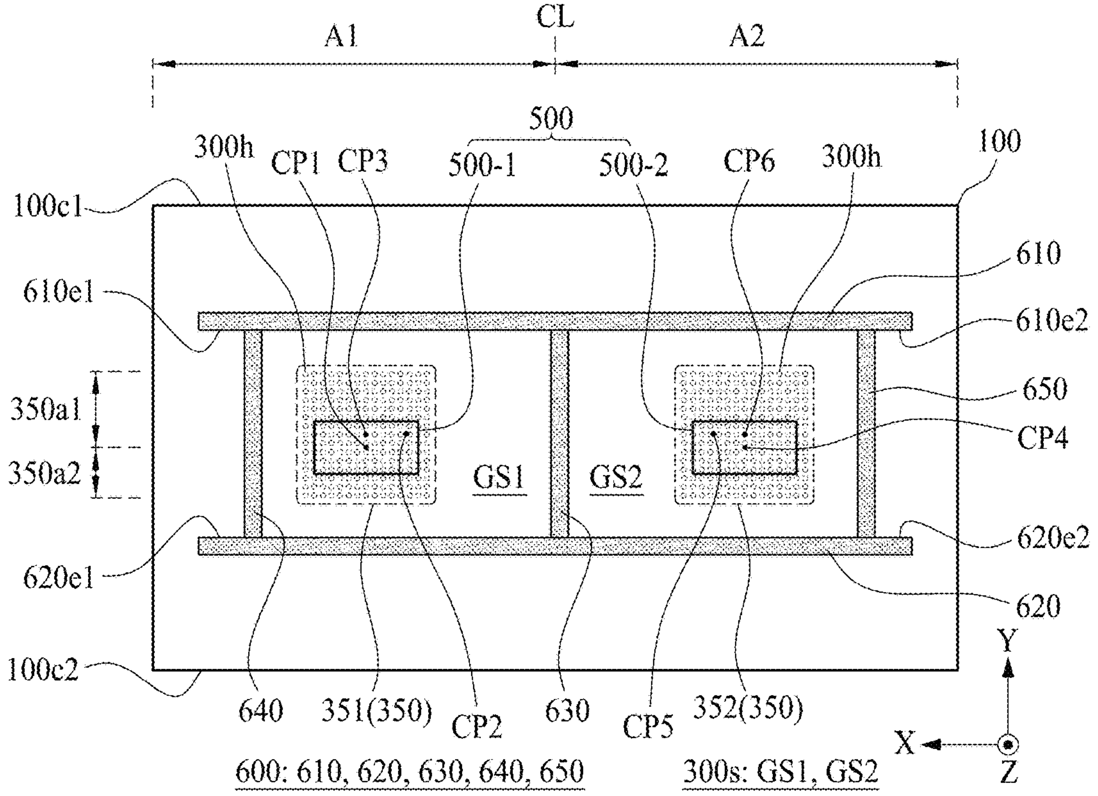
FIG. 4 illustrates a rear surface of a vibration member, a vibration apparatus, a plurality of holes, and a partition illustrated in FIGS. 2 and 3.

The supporting member 300 according to an aspect of the present disclosure may include one or more hole regions 350 including the plurality of holes 300*h*. The vibration apparatus 500 may overlap with some (or a portion) of the plurality of holes 300*h* at the one or more hole regions 350. Some of the plurality of holes 300*h* may overlap with the vibration apparatus 500, and the other (or remaining) of the plurality of holes 300*h* may be configured at a periphery of the vibration apparatus 500. A center portion of the vibration apparatus 500 may be spaced apart from a center portion of the hole region 350. For example, the one or more hole regions 350 may each include a first side (or a left side of the hole region 350 as shown in FIG. 4, or a first portion or a left portion) and a second side (or a right side of the hole region 350 as shown in FIG. 4, or a second portion or a right portion) in the second direction Y, and a third side (or an upper side of the hole region 350 as shown in FIG. 4, or a third portion or an upper portion) and a fourth side (or a lower side of the hole region 350 as shown in FIG. 4, or a fourth portion or a lower portion) in the first direction X. The center portion of the vibration apparatus 500 may be located at a center line between the first side and the second side of the hole region 350 and may be located between the fourth side of the hole region 350 and a center portion of the hole region 350.

The one or more hole regions 350 may include a first sub-hole region which overlaps with a rear surface of the vibration member 100 at a periphery of the first side (or a first long side, e.g., the upper long side of the vibration apparatus 500 as shown in FIG. 4) of the vibration apparatus 500 in the first direction X and a second sub-hole region which overlaps with a rear surface of the vibration member 100 at a periphery of the second side (or a second long side, e.g., the lower long side of the vibration apparatus 500 as shown in FIG. 4), which is opposite to the first side, of the vibration apparatus 500 and has a size which is smaller than that of the first sub-hole region. For example, the first sub-hole region may include a region, which is between the third side of the hole region 350 and a center line of the vibration apparatus 500 parallel to the first direction X, of the hole region 350. For example, the second sub-hole region may include a region, which is between the fourth side of the hole region 350 and a center line of the vibration apparatus 500 parallel to the first direction X, of the hole region 350.

The one or more hole regions 350 may be configured at the supporting member 300 to overlap with each of the first and second vibration apparatuses 500-1 and 500-2 of the vibration apparatus 500, and may have a size lager than the size of the vibration apparatus 500. The one or more hole regions 350 may be configured at the first supporting part 310 of the supporting member 300 to overlap with each of the first and second vibration apparatuses 500-1 and 500-2 of the vibration apparatus 500.

The supporting member 300 according to an aspect of the present disclosure may include a first hole region 351 and a second hole region 352. Each of the first hole region 351 and the second hole region 352 may include a plurality of holes 300*h*. The first hole region 351 may be configured at the supporting member 300 to overlap with the first vibration apparatus 500-1. The first hole region 351 may be configured at the first supporting part 310 of the supporting member 300 to overlap with the first vibration apparatus 500-1. The second hole region 352 may be configured at the supporting member 300 to overlap with the second vibration apparatus 500-2. The second hole region 352 may be configured at the first supporting part 310 of the supporting member 300 to overlap with the second vibration apparatus 500-2.

Each of the first hole region 351 and the second hole region 352 may be configured to have a size corresponding to a size of the vibration apparatus 500, at a region of the first supporting part 310 of the supporting member 300. The first hole region 351 may overlap the first vibration apparatus 500-1 and have a size lager than the size of the first vibration apparatus 500-1. The second hole region 352 may overlap the second vibration apparatus 500-2 and have a size lager than the size of the second vibration apparatus 500-2. Each of the first hole region 351 and the second hole region 352 may overlap with the vibration apparatus 500 and may have a size which is greater than that of the vibration apparatus 500. For example, a size of each of the one or more hole regions 350, the first hole region 351, and the second hole region 352 may be three times a size of the vibration apparatus 500, but aspects of the present disclosure are limited thereto.

In each of the first hole region 351 and the second hole region 352, the number and density of holes 300*h* per unit area may be the same. Outermost holes of the plurality of holes 300*h* in each of the first hole region 351 and the second hole region 352 may be spaced apart from an end (or a side or one side or a portion or one portion) of the vibration apparatus 500. For example, each of the first hole region 351 and the second hole region 352 may be a hole arrangement region, a hole pattern, a hole pattern region, a hole pattern part, an air duct region, an air duct part, an air entrance region, an air discharge region, an air pressure control region, or a vent area (or a vent region), but aspects of the present disclosure are limited thereto.

According to an aspect of the present disclosure, the plurality of holes 300*h* may communicate (or connect) the internal space 300*s* of the apparatus 10 with an external space to reduce an air pressure of the internal space 300*s*, and thus, may increase or expand a band of a low-pitched sound band of sounds (such as the first sound S1a and the second sound S2a) generated based on a vibration of the vibration member 100, thereby improving sound characteristic and/or sound pressure level characteristic of the low-pitched sound band. For example, an air pressure (or pressure) of the internal space 300*s* of the apparatus 10 may be reduced by the plurality of holes 300*h*, and thus, the amount of displacement (or a bending force) of the vibration member 100 or the vibration apparatus 500 may increase, and thus, a band of the low-pitched sound band may increase or be expanded, thereby enhancing sound characteristic and/or sound pressure level characteristic of the low-pitched sound band.

According to another aspect of the present disclosure, in an apparatus in which the hole regions 350 is not configured at the supporting member 300, a largest variation of pressure may occur in the internal space 300*s* where a volume variation is largest, based on a vibration of the vibration member 100 (or the vibration apparatus 500), and thus, the amount of displacement (or a bending force) of the vibration member 100 (or the vibration apparatus 500) may decrease, whereby sound characteristic and/or sound pressure level characteristic of the low-pitched sound band may decrease or be reduced. The internal space 300*s* in which the hole regions 350 is not configured at the supporting member 300 may be a closed internal space 300*s*. For example, in the apparatus including the closed internal space 300*s*, a pressure (or an air pressure) of the internal space 300*s* may increase based on sound wave or sound generated by a vibration of the vibration member 100 (or the vibration apparatus 500), and thus, the amount of displacement (or a bending force) of the vibration member 100 (or the vibration apparatus 500) may decrease, whereby sound characteristic and/or sound pressure level characteristic of the low-pitched sound band may decrease or be reduced.

The apparatus 10 or the vibration apparatus 500 according to an aspect of the present disclosure may further include a partition 600.

The partition 600 may be configured to surround the vibration apparatus 500. The partition 600 may be configured between the vibration member 100 and the supporting member 300. The partition 600 may be configured between the vibration member 100 and the supporting member 300 to surround the vibration apparatus 500. The partition 600 may be spaced apart from the coupling member 200 and may be surrounded by the coupling member 200. Therefore, the apparatus 100 according to an aspect of the present disclosure may further include a gap space configured between the vibration member 100, the supporting member 300, and the partition 600. The vibration apparatus 500 may be disposed at the gap space, and in the same plane, a center portion of the vibration apparatus 500 may be spaced apart from a center portion of the gap space. The gap space may be formed by dividing the internal space 300*s* of the apparatus 10 via the partition 600.

The partition 600 may be configured between the vibration member 100 and the supporting member 300 to surround each of the first vibration apparatus 500-1 and the second vibration apparatus 500-2. The partition 600 may configure or define a vibration region of the first region A1 of the vibration member 100 that includes the first vibration apparatus 500-1 and a vibration region of the second region A2 of the vibration member 100 that includes the second vibration apparatus 500-2. The partition 600 may provide a first gap space GS1 at a periphery of the first vibration apparatus 500-1 and a second gap space GS2 at a periphery of the second vibration apparatus 500-2. For example, the partition 600 may be referred to as sound blocking member, sound separation member, a space separation member, an enclosure, a baffle, or the like, but aspects of the present disclosure are not limited thereto.

The partition 600 according to an aspect of the present disclosure may separate a vibration (or sound), generated in the first region A1 of the vibration member 100, from a vibration (or sound) generated in the second region A2 of the vibration member 100, or may minimize or prevent mutual interference. A left sound (such as the sounds S1a and S1b) and a right sound (such as the sounds S2a and S2b) generated based on vibrations of the first region A1 and the second region A2 of the vibration member 100 may be separated from each other by the partition 600, and thus, sound output characteristic of the apparatus 1000 may be more enhanced and the sounds S1a, S1b, S2a, and S2b including a 2-channel sound may be output in the forward direction SOD1 of the vibration member 100 and the rearward direction SOD2 of the supporting member 300, based on the separation of the left and right sounds.

According to an aspect of the present disclosure, the partition 600 may configured with a material having elasticity which enables a certain degree of compression. For example, the partition 600 may be configured with polyurethane or polyolefin, but aspects of the present disclosure are not limited thereto. As another aspect of the present disclosure, the partition 600 may be configured with a single-sided tape, a single-sided foam tape, a single-sided foam pad, a double-sided tape, a double-sided foam tape, a double-sided foam pad, or the like.

The apparatus 10 according to an aspect of the present disclosure may include an open internal space 300*s* in which the plurality of holes 300*h* is configured at the supporting member 300, and thus, sound wave or sound generated in the internal space 300*s* by a vibration of the vibration member 100 (or the vibration apparatus 500) may be discharged to the outside through the plurality of holes 300*h*, whereby a pressure (or an air pressure) of the internal space 300*s* may be reduced. The internal space 300*s* in which the plurality of holes 300*h* is configured at the supporting member 300 may be the open internal space 300*s*. For example, the air of the internal space 300*s* may be discharged to the outside through the plurality of holes 350, based on a vibration of the vibration member 100 (or the vibration apparatus 500), and thus, a pressure (or an air pressure) of the internal space 300*s* may be reduced. Therefore, because the apparatus 10 according to an aspect of the present disclosure includes the open internal space 300*s* based on the plurality of holes 300*h*, a band of the low-pitched sound band may be expanded, sound characteristic and/or sound pressure level characteristic of the low-pitched sound band may be improved, and the sounds S1a, S1b, S2a, and S2b generated based on a vibration of the vibration member 100 (or the vibration apparatus 500) may be output in a forward direction SOD1 of the vibration member 100 and a rearward direction SOD2 of the supporting member 300, respectively.

Therefore, the apparatus 10 according to an aspect of the present disclosure may output the sounds S1a, S1b, S2a, and S2b, where a band of a low pitched sound band extends and sound characteristic and/or sound pressure level characteristic of the low pitched sound band are/is enhanced, in both directions SOD1 and SOD2 and may output sounds including left sounds S1a and S1b and right sounds S2a and S2b having the form of a 2-channel in the forward direction SOD1 of the vibration member 100 and the rearward direction SOD2 of the supporting member 300, respectively.

FIG. 4 illustrates a rear surface of a vibration member, a vibration apparatus, a plurality of holes, and a partition illustrated in FIGS. 2 and 3.

With reference to FIGS. 2 to 4, a partition 600 according to an aspect of the present disclosure may include first to fifth partition members 610 to 650.

The first and second partition members 610 and 620 may be disposed in parallel with each other. The first and second partition members 610 and 620 may be disposed in parallel with the vibration apparatus 500 interposed therebetween. The first and second partition members 610 and 620 may be disposed in parallel with the first vibration apparatus 500-1 and the second vibration apparatus 500-2 of the vibration apparatus 500 interposed therebetween. Each of the first and second partition members 610 and 620 may be disposed in parallel with a first direction X. For example, each of the first and second partition members 610 and 620 may be disposed in parallel with a long side of the first vibration apparatus 500-1 and the second vibration apparatus 500-2 in the first direction X.

The third partition member 630 may be disposed between the first partition member 610 and the second partition member 620 and may be disposed between the first vibration apparatus 500-1 and the second vibration apparatus 500-2. The third partition member 630 may be disposed in parallel with a second direction Y. The third partition member 630 may be disposed at a center line CL between the first region A1 and the second region A2 of the vibration member 100. For example, the third partition member 630 may be disposed closer to the second vibration apparatus 500-2 than the first vibration apparatus 500-1.

The fourth partition member 640 may be disposed between the first partition member 610 and the second partition member 620 and may be disposed between the first vibration apparatus 500-1 and a coupling member 200. The fourth partition member 640 may be disposed between the first vibration apparatus 500-1 and the second supporting part (a side wall) 330 of the supporting member 300. The fourth partition member 640 may be disposed in parallel with the third partition member 630 with the first vibration apparatus 500-1 therebetween. The fourth partition member 640 may be disposed closer to the first vibration apparatus 500-1 than the coupling member 200.

The fifth partition member 650 may be disposed between the first partition member 610 and the second partition member 620 and may be disposed between the second vibration apparatus 500-2 and the coupling member 200. The fifth partition member 650 may be disposed in parallel with the third partition member 630 with the second vibration apparatus 500-2 therebetween. The fifth partition member 650 may be disposed closer to the second vibration apparatus 500-2 than the coupling member 200.

Each of a first end portion (or one side or one portion) **610*e*1 of the first partition member 610 and a first end portion (or one side or one portion) 620*e*1 of the second partition member 620 may protrude toward a lateral surface of the vibration member 100 from the fourth partition member 640. Each of the first end portion 610*e*1 of the first partition member 610 and the first end portion 620*e*1 of the second partition member 620 may protrude toward the coupling member 200 from the fourth partition member 640. Each of the first end portion 610*e*1 of the first partition member 610 and the first end portion 620*e*1 of the second partition member 620 may be disposed between the fourth partition member 640 and the coupling member 200. Each of the first end portion 610*e*1 of the first partition member 610 and the first end portion 620*e*1 of the second partition member 620 may trap a reflected wave which occurs due to the coupling member 200 when the vibration member 100** is vibrating, and thus, a reduction in sound pressure level characteristic caused by a standing wave occurring due to a reflected wave and a progressive wave may be prevented or minimized.

Each of a second end portion (or other side or other portion) **610*e*2 of the first partition member 610 and a second end portion (or other side or other portion) 610*e*2 of the second partition member 620 may protrude toward the coupling member 200 from the fifth partition member 650. Each of the second end portion 610*e*2 of the first partition member 610 and the second end portion 620*e*2 of the second partition member 620 may be disposed between the fifth partition member 650 and the coupling member 200. Each of the second end portion 610*e*2 of the first partition member 610 and the second end portion 620*e*2 of the second partition member 620 may trap a reflected wave which occurs due to the coupling member 200 when the vibration member 100** is vibrating, and thus, a reduction in sound pressure level characteristic caused by a standing wave occurring due to a reflected wave and a progressive wave may be prevented or minimized.

The first to fourth partition members 610 to 640 may provide a first gap space GS1. For example, the first gap space GS1 may be a space surrounded by the first to fourth partition members 610 to 640. The first to third partition members 610 to 630 and the fifth partition member 650 may provide a second gap space GS2. The second gap space GS2 may be a space surrounded by the first to third partition members 610 to 630 and the fifth partition member 650.

The first vibration apparatus 500-1 may be disposed at the first gap space GS1. A center portion CP1 of the first vibration apparatus 500-1 may be spaced apart from a center portion CP2 of the first gap space GS1. For example, to minimize vibration interference between the first region A1 and the second region A2 of the vibration member 100, the center portion CP1 of the first vibration apparatus 500-1 may be spaced apart from the center portion CP2 of the first gap space GS1. For example, the center portion CP1 of the first vibration apparatus 500-1 may be disposed between the center portion CP2 of the first gap space GS1 and the fourth partition member 640. The center portion CP1 of the first vibration apparatus 500-1 may be spaced apart from a center portion CP3 of the first hole region 351. For example, the center portion CP1 of the first vibration apparatus 500-1 may be spaced apart from the center portion CP3 of the first hole region 351 along the second direction Y.

The second vibration apparatus 500-2 may be disposed at the second gap space GS2. A center portion CP4 of the second vibration apparatus 500-2 may be spaced apart from a center portion CP5 of the second gap space GS2. For example, to minimize vibration interference between the first region A1 and the second region A2 of the vibration member 100, the center portion CP4 of the second vibration apparatus 500-2 may be spaced apart from the center portion CP5 of the second gap space GS2. For example, the center portion CP4 of the second vibration apparatus 500-2 may be disposed between the center portion CP5 of the second gap space GS2 and the fifth partition member 650. The center portion CP4 of the second vibration apparatus 500-2 may be spaced apart from a center portion CP6 of the second hole region 352. For example, the center portion CP4 of the second vibration apparatus 500-2 may be spaced apart from the center portion CP6 of the second hole region 352 along the second direction Y.

The hole region 350 (or the first and second hole regions 351 and 352) may include a first sub-hole region (or an upper hole region) **350*a*1 and a second sub-hole region (or a lower hole region) 350*a*2, with respect to the second direction Y and the center portions CP1 and CP4 of the vibration apparatus 500**.

The first sub-hole region **350*a*1 may be configured between the center portions CP1 and CP4 of the vibration apparatus 500 and an upper surface (or a first lateral surface or a first long side) 100*c*1 of the vibration member 100, with respect to the second direction Y. The second sub-hole region 350*a*2 may be provided between the center portions CP1 and CP4 of the vibration apparatus 500 and a lower surface (or a second lateral surface or a second long side) 100*c*2 of the vibration member 100**, with respect to the second direction Y.

The first sub-hole region **350*a*1 may have a size which is greater than that of the second sub-hole region 350*a*2. Therefore, the number of holes 300*h* configured at the first sub-hole region 350*a*1 may be more than the number of holes 300*h* which are to be configured at the second sub-hole region 350*a*2. Accordingly, an output area (or intensity) of the sound (or a rear upper sound) for outputting (or discharged or transferred) in the rearward direction SOD2 of the supporting member 300 through the first sub-hole region 350*a*1 may increase more than an output area (or intensity) of the sound (or a rear lower sound) for outputting (or discharged or transferred) in the rearward direction SOD2 of the supporting member 300 through the second sub-hole region 350*a*2**.

The hole region 350 (or the first and second hole regions 351 and 352) may further include a third sub-hole region (or a left sub-hole region) and a fourth sub-hole region (or a right sub-hole region), with respect to the first direction X and the center portions CP1 and CP4 of the vibration apparatus 500. The third sub-hole region and the fourth sub-hole region may have the same size. Therefore, the number of holes **300*h* configured at the third sub-hole region may be equal to the number of holes 300*h* which are to be configured the fourth sub-hole region. Accordingly, the output area (or intensity) of the sound for outputting (or discharged or transferred) in the rearward direction SOD2 of the supporting member 300 through the third sub-hole region may be equal to then output area (or intensity) of the sound for outputting (or discharged or transferred) in the rearward direction SOD2 of the supporting member 300** through the fourth sub-hole region.

Figure 5:
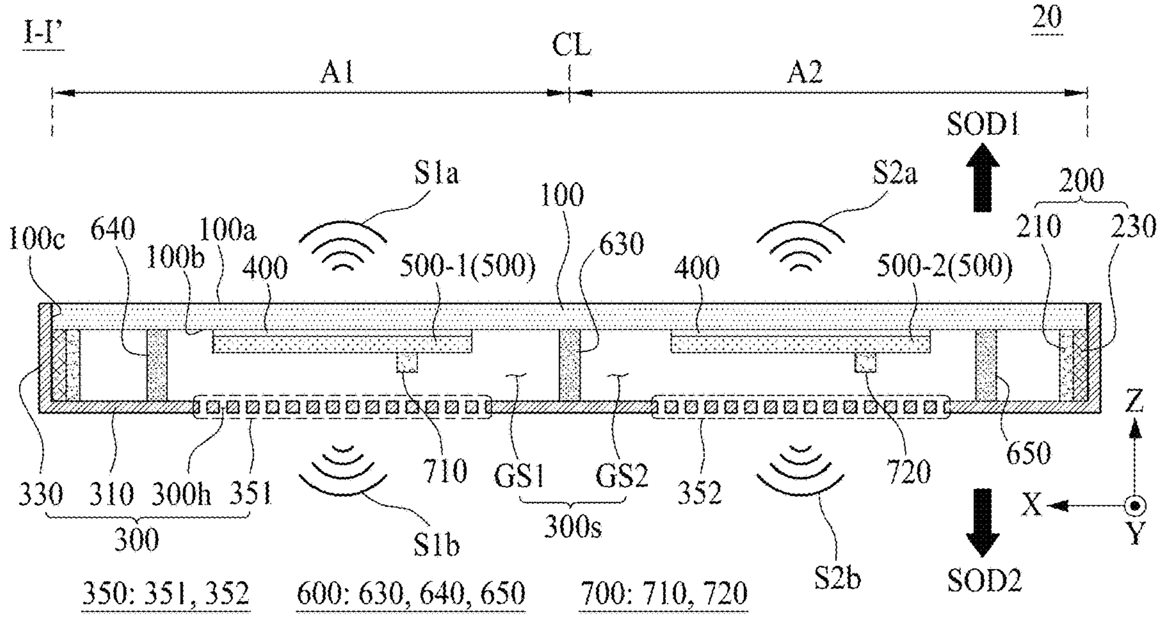
FIG. 5 is another cross-sectional view taken along line I-I' illustrated in FIG. 1 according to an aspect of the present disclosure.
Figure 6:
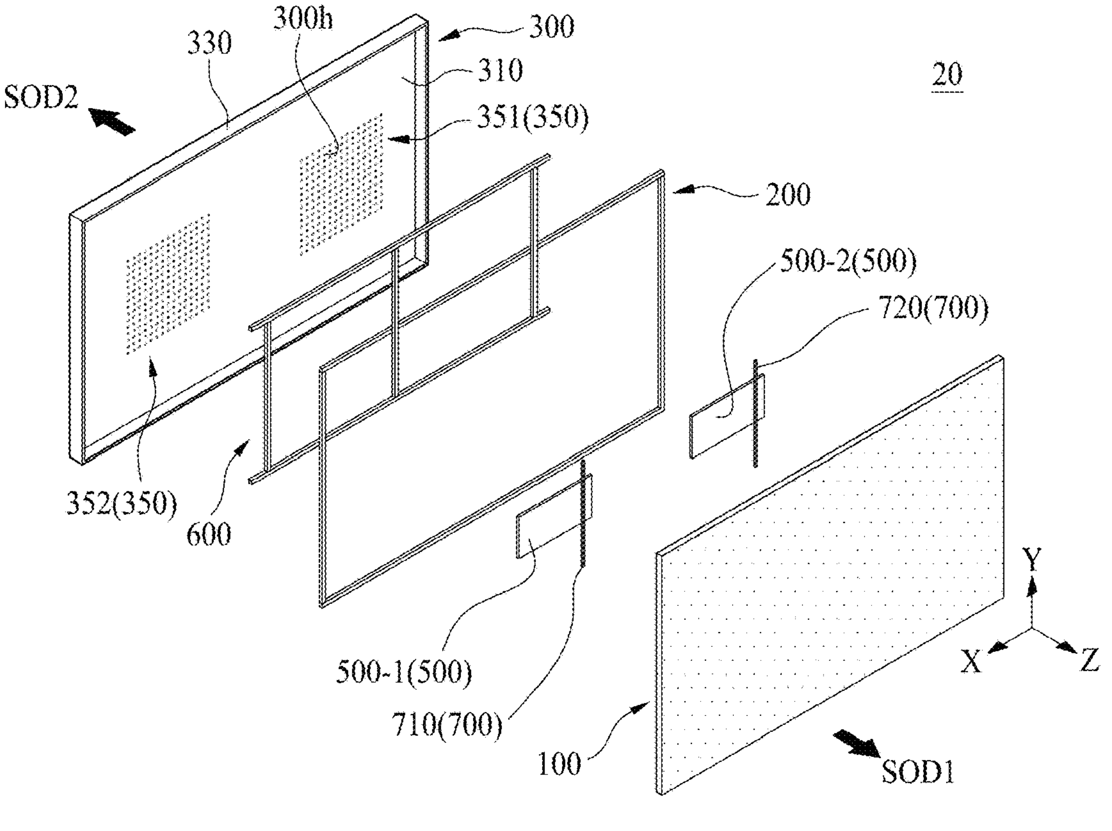
FIG. 6 is an exploded perspective view illustrating an apparatus according to another aspect of the present disclosure illustrated in FIGS. 1 and 5 according to an aspect of the present disclosure.
Figure 7:
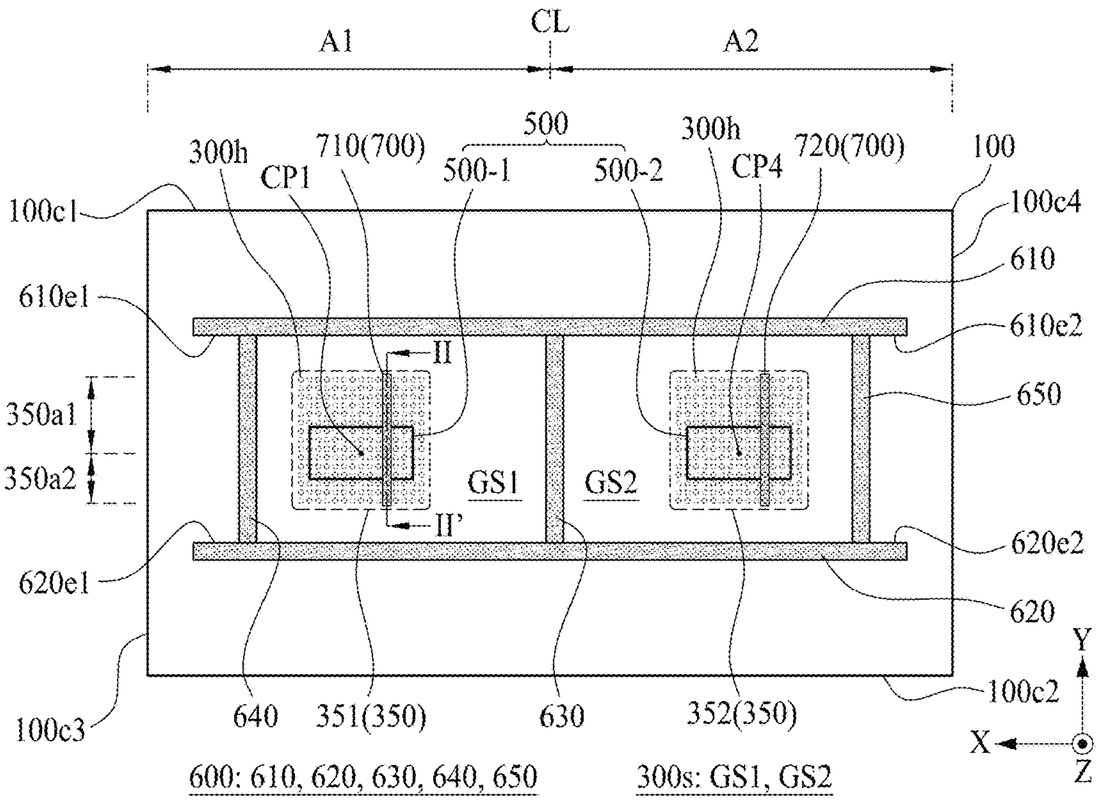
FIG. 7 illustrates a rear surface of a vibration member, a vibration apparatus, a plurality of holes, and a partition illustrated in FIGS. 5 and 6 according to an aspect of the present disclosure.
Figure 8:
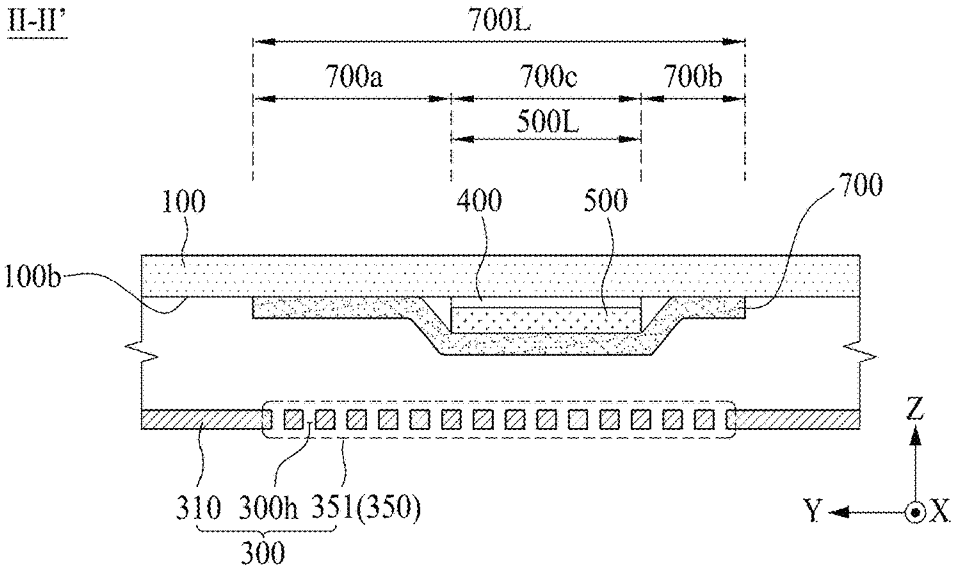
FIG. 8 is a cross-sectional view taken along line II-II' illustrated in FIG. 7 according to an aspect of the present disclosure.

FIG. 5 is another cross-sectional view taken along line I-I' illustrated in FIG. 1 according to an aspect of the present disclosure. FIG. 6 is an exploded perspective view illustrating an apparatus according to another aspect of the present disclosure illustrated in FIGS. 1 and 5 according to an aspect of the present disclosure. FIG. 7 illustrates a rear surface of a vibration member, a vibration apparatus, a plurality of holes, and a partition illustrated in FIGS. 5 and 6 according to an aspect of the present disclosure. FIG. 8 is a cross-sectional view taken along line II-II' illustrated in FIG. 7 according to an aspect of the present disclosure. FIGS. 5 to 8 illustrate an apparatus according to another aspect of the present disclosure. FIGS. 5 to 8 illustrate an aspect where a pad member is additionally provided in the apparatus 10 according to an aspect of the present disclosure described above with reference to FIGS. 1 to 4. An apparatus 20 according to another aspect of the present disclosure may further include a pad member. Hereinafter, a configuration difference between the apparatus 20 according to another aspect of the present disclosure and the apparatus 10 according to an aspect of the present disclosure will be described. The descriptions of the apparatus 10 according to an aspect of the present disclosure described above with reference to FIGS. 1 to 4 may be included in descriptions of the apparatus 20 according to another aspect of the present disclosure.

With reference to FIGS. 5 to 8, the apparatus 20 according to another aspect (or a second aspect) of the present disclosure may further include a pad member 700 which overlaps with the vibration apparatus 500.

The pad member 700 may be configured to decrease peak and/or dip in a specific frequency of sound generated based on a vibration of the vibration apparatus 500. The pad member 700 may improve a vibration mode in a horizontal direction when the vibration apparatus 500 having a rectangular shape is vibrating, and thus, may decrease peak and/or dip in a specific frequency of sound generated based on a vibration of the vibration apparatus 500. For example, the pad member 700 may decrease (or prevent) a vibration of an unbalance vibration portion when the vibration apparatus 500 having a rectangular shape is vibrating horizontally or may balance a horizontal vibration of the vibration apparatus 500, and thus, may decrease peak and/or dip in a specific frequency of sound generated based on a vibration of the vibration apparatus 500.

According to another aspect of the present disclosure, sound pressure level of sound generated based on a vibration of the vibration apparatus 500 may be expressed as the following Equation 1.

$$\text{Sound pressure level}=20\log(P/Po)$$

$$P=(m\times a)/A=m/A\times(d/s^2) \quad \text{[Equation 1]}$$

In Equation 1, Po may denote a reference pressure ($20\times10^6$), m may denote a mass, a may denote an acceleration, A may denote an area, d may denote the amount of displacement, and s may denote a frequency.

A vibration apparatus 500 having a rectangular shape according to an aspect of the present disclosure may be relatively higher in vibration in a horizontal direction instead of a vertical direction. Therefore, as seen in Equation 1, when a displacement d of the vibration apparatus 500 is adjusted, sound pressure level in a specific frequency of sound generated based on a vibration of the vibration apparatus 500 may decrease, or peak and/or dip in a specific frequency of sound may be reduced.

According to an aspect of the present disclosure, the pad member 700 may be configured to decrease peak and/or dip in a frequency band of 1 kHz to 3 kHz of sound generated based on a vibration of the vibration apparatus 500. The peak may be a phenomenon where sound pressure level bounces in a specific frequency, and the dip may be a phenomenon where a low sound pressure level is generated as the occurrence of sound having a specific frequency is reduced (or prevented). For example, a frequency band of 1 kHz to 3 kHz of sound may contribute the clarity and sharpness of a tone, and thus, when the peak and/or the dip occur (s) in a frequency band of 1 kHz to 3 kHz of sound, the clarity and sharpness of sound may be reduced. Accordingly, the pad member 700 may be configured to decrease the peak and/or the dip occurring in a frequency band of 1 kHz to 3 kHz of sound, thereby improving the clarity and sharpness of sound.

The pad member 700 may be configured to overlap with a portion of the vibration apparatus 500 to improve a vibration mode in a horizontal direction when the vibration apparatus 500 is vibrating. The pad member 700 may be configured to intersect with a portion of the vibration apparatus 500. The pad member 700 may be connected to a portion of the vibration apparatus 500. The pad member 700 may be connected to a portion of the vibration apparatus 500 and may be connected to the second surface 100*b* of the vibration member 100. The pad member 700 may be connected to the second surface (or rear surface) 100*b* of the vibration member 100 to intersect with the vibration apparatus 500.

The pad member 700 according to an aspect of the present disclosure may be connected to a portion of the vibration apparatus 500 and the second surface 100*b* of the vibration member 100, and thus, may decrease (or prevent) a vibration (or a horizontal vibration) of a portion of the vibration apparatus 500. The pad member 700 may decrease (or prevent) a vibration width (or a displacement width) of a portion of the vibration apparatus 500, and thus, a shape of a vibration mode in a horizontal direction may be improved when the vibration apparatus 500 is vibrating, thereby decreasing the peak and/or the dip in a frequency band of 1 kHz to 3 kHz of sound generated based on a vibration of the vibration apparatus 500. Accordingly, the pad member 700 may improve the clarity and sharpness of sound.

The pad member 700 according to an aspect of the present disclosure may include a first pad member 710 and a second pad member 720.

The pad member 700 or each of the first and second pad members 710 and 720 may include a rectangular shape which has a first length 500L parallel to the first direction X and a second length 700L (as shown in FIG. 8) parallel to the second direction Y. For example, the pad member 700 or each of the first and second pad members 710 and 720 may include a line shape which has the first length and the second length 700L. The pad member 700 or each of the first and second pad members 710 and 720 may have the first length which is smaller than the first length of the vibration apparatus 500 (i.e., a length of the vibration apparatus 500 in parallel with the first direction X) and the second length 700L which is greater than the second length of the vibration apparatus 500 (i.e., a length of the vibration apparatus 500 in parallel with the second direction Y). The second length 700L of the pad member 700 or each of the first and second pad members 710 and 720 may be greater than a first length 500L of the vibration apparatus 500.

The pad member 700 or each of the first and second pad members 710 and 720 may have a length corresponding to the hole region 350 provided in the supporting member 300. For example, the second length 700L of the pad member 700 or each of the first and second pad members 710 and 720 may be greater than or equal to a length of the hole region 350.

The pad member 700 or each of the first and second pad members 710 and 720 may be spaced apart from the center portions CP1 and CP4 of the vibration apparatus 500.

The first pad member 710 may be spaced apart from the center portion CP1 of the first vibration apparatus 500-1 toward a center portion of the vibration member 100. The first pad member 710 (or part of it) may be disposed at the first vibration apparatus 500-1 between the center portion CP1 of the first vibration apparatus 500-1 and the center portion of the vibration member 100. The first pad member 710 may be disposed at a partial region between the center portion CP1 of the first vibration apparatus 500-1 and one end (or one short side or a first short side) of the first vibration apparatus 500-1, with respect to the first direction X. For example, the first pad member 710 may be disposed at a center portion between one end and the center portion CP1 of the vibration apparatus 500, with respect to the first direction X. For example, one end of the first vibration apparatus 500-1 may be adjacent to the center portion of the vibration member 100. The other end (or the other short side or a second short side), which is opposite to the one end, of the first vibration apparatus 500-1 may be adjacent to a left surface (or a third lateral surface or a first short side) 100*c*3 of the vibration member 100. The first pad member 710 may be connected to the second surface (or rear surface) 100*b* of the vibration member 100 to intersect with the portion, which is spaced apart from a center portion CP1, of the first vibration apparatus 500-1.

The second pad member 720 may be spaced apart from a right surface (or a fourth lateral surface or a second short side) 100*c*4 of the vibration member 100 toward the center portion CP4 of the second vibration apparatus 500-2. The second pad member 720 may be disposed at a partial region between the center portion CP4 of the second vibration apparatus 500-2 and one end (or one short side or a first short side) of the second vibration apparatus 500-2, with respect to the first direction X. For example, the second pad member 720 may be disposed at a center portion between one end and the center portion CP1 of the vibration apparatus 500, with respect to the first direction X. For example, one end of the second vibration apparatus 500-2 may be adjacent to a left surface 100*c*4 of the vibration member 100, and the other end (or the other short side or a second short side), which is opposite to the one end, of the second vibration apparatus 500-2 may be adjacent to the center portion of the vibration member 100. The second pad member 720 may be connected to the second surface (or rear surface) 100*b* of the vibration member 100 to intersect with the portion, which is spaced apart from a center portion CP4, of the second vibration apparatus 500-2. Part of the second pad member 720 may be disposed between the center portion CP4 of the second vibration apparatus 500-2 and the side surface 100*c*4 of the vibration member 100.

The pad member 700 or each of the first and second pad members 710 and 720 may include a first pad portion (or a first portion) 700*a*, a second pad portion (or a second portion) 700*b*, and a third pad portion (or a center portion) 700*c*, with respect to the second direction Y.

The first pad portion 700*a* and the second pad portion 700*b* may be connected to or attached on the second surface (or rear surface) 100*b* of the vibration member 100 with the vibration apparatuses 500, 500-1, and 500-2 therebetween.

The first pad portion 700*a* may be connected to or attached on the second surface 100*b* of the vibration member 100. For example, the first pad portion 700*a* may be disposed between the upper surface 100*c*1 of the vibration member 100 and the vibration apparatuses 500, 500-1, and 500-2. For example, the first pad portion 700*a* may overlap with a portion of the first sub-hole region 350*a*1 of the hole region 350.

The second pad portion 700*b* may be connected to or attached on the second surface 100*b* of the vibration member 100. For example, the second pad portion 700*b* may be disposed between the lower surface 100*c*2 of the vibration member 100 and the vibration apparatuses 500, 500-1, and 500-2. For example, the second pad portion 700*b* may overlap with a portion of the second sub-hole region 350*a*2 of the hole region 350.

The third pad portion 700*c* may be connected to or attached on a rear surface of each of the vibration apparatuses 500, 500-1, and 500-2. The third pad portion 700*c* may be connected between the first pad portion 700*a* and the second pad portion 700*b* and may be connected to or attached on the rear surface of each of the vibration apparatuses 500, 500-1, and 500-2. The third pad portion 700*c* may be directly connected to or attached on the rear surface of each of the vibration apparatuses 500, 500-1, and 500-2. For example, the third pad portion 700*c* may overlap with holes 300*h*, overlapping with the vibration apparatuses 500, 500-1, and 500-2, of the plurality of holes 300*h* in the hole region 350. For example, the third pad portion 700*c* may overlap with the other portion of the first sub-hole region 350*a*1 and the other portion of the second sub-hole region 350*a*2. For example, the first pad portion 700*a* may extend along the second direction Y from one side (or one portion) of the third pad portion 700*c*, and the second pad portion 700*b* may extend along the second direction Y from the other side (or the other portion) of the third pad portion 700*c*.

The pad member 700 or each of the first and second pad members 710 and 720 may overlap with the plurality of holes 300*h* in the hole region 350 and may be spaced apart from the plurality of holes 300*h* (or the hole region 350). For example, the pad member 700 or each of the first and second pad members 710 and 720 may be spaced apart from the plurality of holes 300*h* (or the hole region 350) so as not to hinder an output (or discharging) of a rearward sound through the plurality of holes 300*h* in the hole region 350. For example, the pad member 700 or each of the first and second pad members 710 and 720 may be spaced apart from the supporting member 300 without contacting the hole region 350 of the supporting member 300. For example, the pad member 700 or each of the first and second pad members 710 and 720 may be disposed between the vibration apparatus 500 and the first supporting part 310 of the supporting member 300 overlapping with the hole region 350, and may be spaced apart from the first supporting part 310. For example, a lower surface (or a rear surface) of the pad member 700 or each of the first and second pad members 710 and 720 may be spaced apart from the first support part 310.

The pad member 700 or each of the first and second pad members 710 and 720 may be a resonance pad, a resonance control pad, a resonance balancing pad, a vibration control pad, or a vibration balancing pad.

The pad member 700 or each of the first and second pad members 710 and 720 according to another aspect (or the second aspect) of the present disclosure may be configured with a material which absorbs or adjusts a vibration of the vibration apparatuses 500, 500-1, and 500-2. For example, each of the pad member 700 or each of the first and second pad members 710 and 720 may include a vibration absorption layer which includes one or more of a silicone-based polymer, paraffin wax, and an acrylic polymer, but aspects of the present disclosure are not limited thereto. For example, each of the pad member 700 or each of the first and second pad members 710 and 720 may be configured as a single-sided tape, a single-sided foam tape, a single-sided cushion tape, a single-sided sponge tape, a single-sided adhesive pad, a single-sided adhesive foam tape, a single-sided adhesive cushion pad, a double-sided tape, a double-sided foam tape, a double-sided cushion tape, a double-sided sponge tape, a double-sided adhesive pad, a double-sided adhesive foam tape, a double-sided adhesive cushion pad, or the like. For example, each of the first pad member 701 and the second pad member 702 may be configured with a material which differs from a partition 600, but aspects of the present disclosure are not limited thereto.

Because the apparatus 20 according to another aspect (or the second aspect) of the present disclosure includes the pad member 700 which overlaps with the vibration apparatus 500 or is disposed at a portion of the vibration apparatus 500, a shape of a vibration mode in a horizontal direction may be improved when the vibration apparatus 500 is vibrating, and thus, peak and/or dip in a frequency band of 1 kHz to 3 kHz of sound generated based on a vibration of the vibration apparatus 500 may be reduced, thereby improving the clarity and sharpness of sound.

Figure 9:
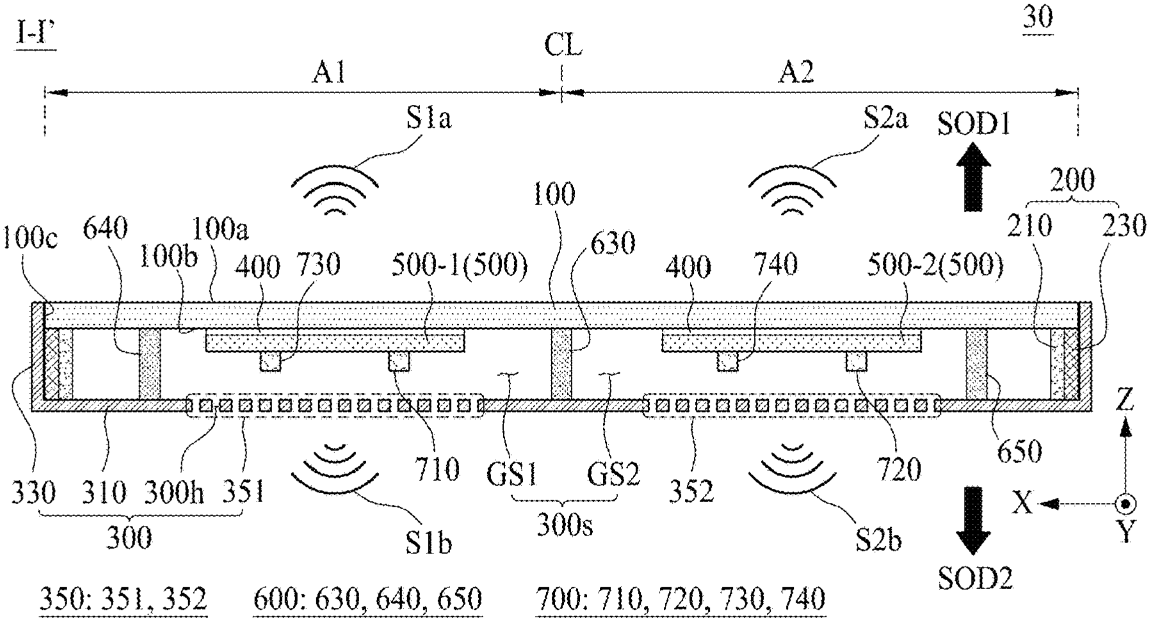
FIG. 9 is another cross-sectional view taken along line I-I' illustrated in FIG. 1 according to an aspect of the present disclosure.
Figure 10:
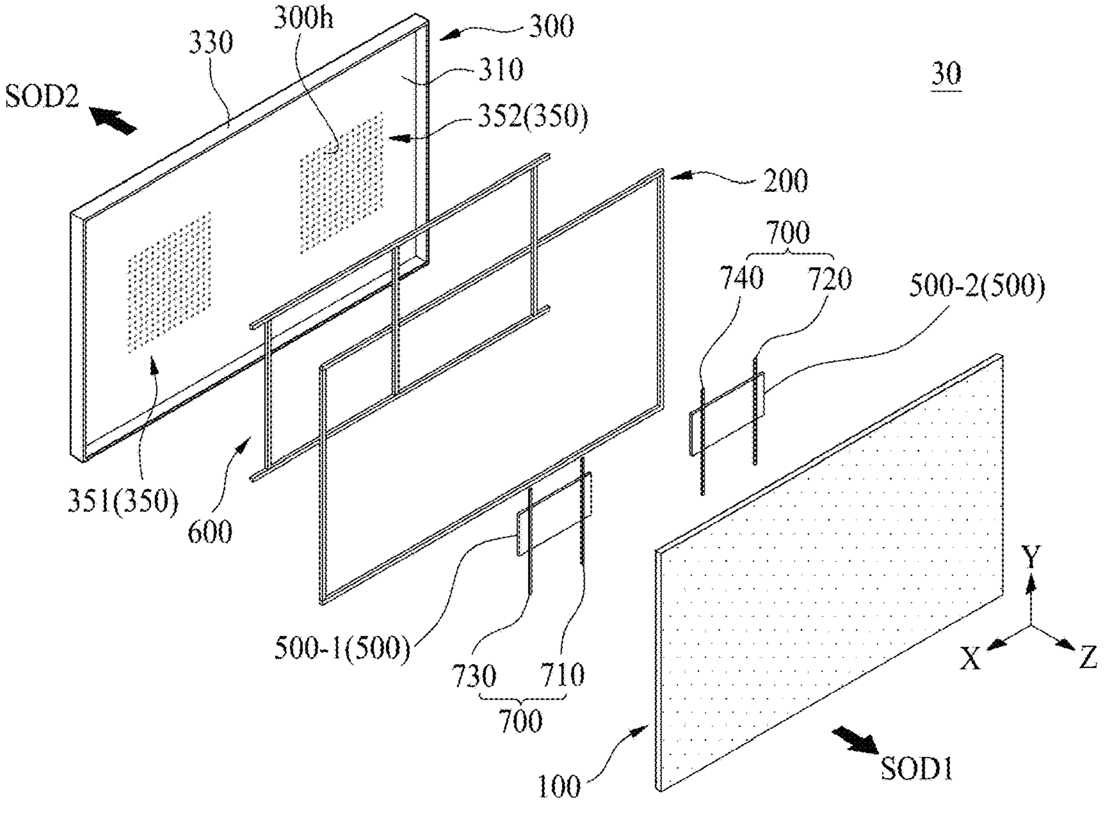
FIG. 10 is an exploded perspective view illustrating an apparatus according to another aspect of the present disclosure illustrated in FIGS. 1 and 9 according to an aspect of the present disclosure.
Figure 11:
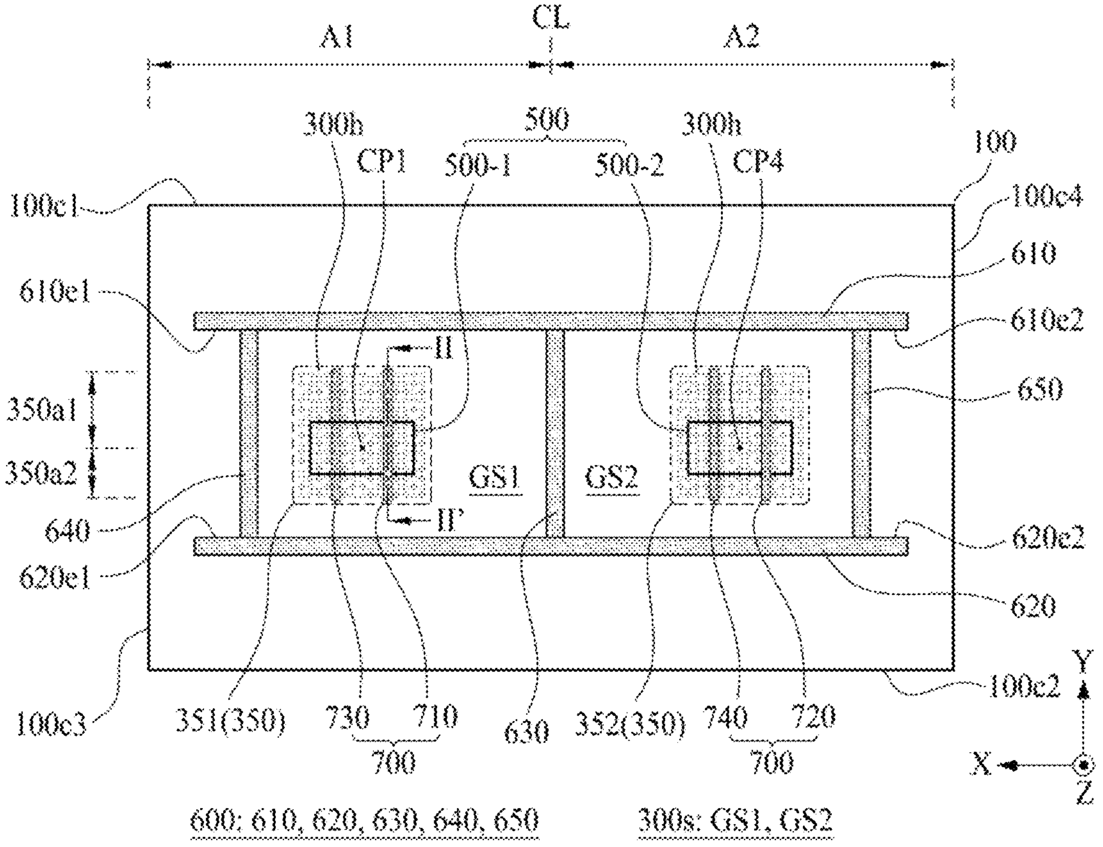
FIG. 11 illustrates a rear surface of a vibration member, a vibration apparatus, a plurality of holes, and a partition illustrated in FIGS. 9 and 10 according to an aspect of the present disclosure.

FIG. 9 is another cross-sectional view taken along line I-I' illustrated in FIG. 1 according to an aspect of the present disclosure. FIG. 10 is an exploded perspective view illustrating an apparatus according to another aspect of the present disclosure illustrated in FIGS. 1 and 9 according to an aspect of the present disclosure. FIG. 11 illustrates a rear surface of a vibration member, a vibration apparatus, a plurality of holes, and a partition illustrated in FIGS. 9 and 10 according to an aspect of the present disclosure. FIGS. 9 to 11 illustrate an apparatus 30 according to another aspect of the present disclosure. FIGS. 9 to 11 illustrate an aspect where a sub-pad member is additionally provided in the apparatus according to another aspect of the present disclosure described above with reference to FIGS. 5 to 8. An apparatus 30 according to another aspect of the present disclosure may further include a sub-pad member. Hereinafter, a configuration difference between the apparatus 30 according to another aspect of the present disclosure and the apparatus 20 according to another aspect of the present disclosure will be described. The descriptions of the apparatus according to another aspect of the present disclosure described above with reference to FIGS. 1 to 8 may be included in descriptions of the apparatus 30 according to another aspect of the present disclosure.

With reference to FIGS. 9 to 11, in the apparatus 30 according to another aspect (or a third aspect) of the present disclosure, a pad member 700 may further include first and second sub-pad members 730 and 740 which overlaps with the vibration apparatus 500. The pad member 700 may further include the first sub-pad member 730, overlapping with the first vibration apparatus 500-1 of the vibration apparatus 500, and the second sub-pad member 740 overlapping with the second vibration apparatus 500-2 of the vibration apparatus 500.

The first sub-pad member 730 may be configured to overlap with another portion of the first vibration apparatus 500-1, to improve a vibration mode in a horizontal direction when the first vibration apparatus 500-1 is vibrating. The first sub-pad member 730 may be configured to intersect with another portion of the first vibration apparatus 500-1. The first sub-pad member 730 may be connected to another portion of the first vibration apparatus 500-1. The first sub-pad member 730 may be connected to another portion of the first vibration apparatus 500-1 and may be connected to the second surface 100*b* of the vibration member 100. The first sub-pad member 730 may be connected to the second surface 100*b* of the vibration member 100 to intersect with another portion of the first vibration apparatus 500-1. For example, the first sub-pad member 730 may be a third pad member.

The first sub-pad member 730 may be spaced apart from the center portion CP1 of the first vibration apparatus 500-1 toward the left surface (or the third lateral surface or the first short side) 100*c*3 of the vibration member 100. The first sub-pad member 730 may be configured to be disposed or connected between the center portion CP1 and the other end (or the other short side or the second short side) of the first vibration apparatus 500-1. The first sub-pad member 730 may be disposed in parallel with the first pad member 710 with the center portion CP1 of the first vibration apparatus 500-1 therebetween. For example, the first sub-pad member 730 may be configured to overlap with a portion of the first vibration apparatus 500-1, and the first sub-pad member 730 may be configured to overlap with another portion of the first vibration apparatus 500-1.

According to an aspect of the present disclosure, except for that the first sub-pad member 730 is configured to overlap with another portion of the first vibration apparatus 500-1, the first sub-pad member 730 may include the same material and size as those of the first pad member 710, and thus, repeated descriptions thereof are omitted.

The first sub-pad member 730 may improve a vibration mode in a horizontal direction when the first vibration apparatus 500-1 is vibrating together with the first pad member 710, and thus, may decrease peak and/or dip in a specific frequency of sound generated based on a vibration of the first vibration apparatus 500-1. The first sub-pad member 730 and the first pad member 710 may decrease (or prevent) a vibration of an unbalance vibration portion when the first vibration apparatus 500-1 having a rectangular shape is horizontally vibrating, or may balance a horizontal vibration of the first vibration apparatus 500-1, and thus, may be configured to decrease peak and/or dip in a specific frequency of sound generated based on a vibration of the first vibration apparatus 500-1. Accordingly, the first sub-pad member 730 and the first pad member 710 may be configured to decrease peak and/or dip in a frequency band of 1 kHz to 3 kHz of sound, thereby improving the clarity and sharpness of sound.

The second sub-pad member 740 may be configured to overlap with another portion of the second vibration apparatus 500-2, to improve a vibration mode in a horizontal direction when the second vibration apparatus 500-2 is vibrating. The second sub-pad member 740 may be configured to intersect with another portion of the second vibration apparatus 500-2. The second sub-pad member 740 may be connected to another portion of the second vibration apparatus 500-2. The second sub-pad member 740 may be connected to another portion of the second vibration apparatus 500-2 and may be connected to the second surface 100*b* of the vibration member 100. The second sub-pad member 740 may be connected to the second surface 100*b* of the vibration member 100 to intersect with another portion of the second vibration apparatus 500-2. For example, the second sub-pad member 740 may be a fourth pad member.

The second sub-pad member 740 may be spaced apart from the center portion CP4 of the second vibration apparatus 500-2 toward the right surface (or the fourth lateral surface or the second short side) 100*c*4 of the vibration member 100. The second sub-pad member 740 may be configured to be disposed or connected between the center portion CP4 and the other end (or the other short side or the second short side) of the second vibration apparatus 500-2.

The second sub-pad member 740 may be disposed in parallel with the second pad member 720 with the center portion CP4 of the second vibration apparatus 500-2 therebetween. For example, the second sub-pad member 740 may be configured to overlap with a portion of the second vibration apparatus 500-2, and the second sub-pad member 740 may be configured to overlap with another portion of the second vibration apparatus 500-2.

According to an aspect of the present disclosure, except for that the second sub-pad member 740 is configured to overlap with another portion of the second vibration apparatus 500-2, the second sub-pad member 740 may include the same material and size as those of the second pad member 720, and thus, repeated descriptions thereof are omitted.

The second sub-pad member 740 may improve a vibration mode in a horizontal direction when the second vibration apparatus 500-2 is vibrating together with the second pad member 720, and thus, may decrease peak and/or dip in a specific frequency of sound generated based on a vibration of the second vibration apparatus 500-2. The second sub-pad member 740 and the second pad member 720 may decrease (or prevent) a vibration of an unbalance vibration portion when the second vibration apparatus 500-2 having a rectangular shape is horizontally vibrating, or may balance a horizontal vibration of the second vibration apparatus 500-2, and thus, may be configured to decrease peak and/or dip in a specific frequency of sound generated based on a vibration of the second vibration apparatus 500-2. Accordingly, the second sub-pad member 740 and the second pad member 720 may be configured to decrease peak and/or dip in a frequency band of 1 kHz to 3 kHz of sound, thereby improving the clarity and sharpness of sound.

Figure 12:
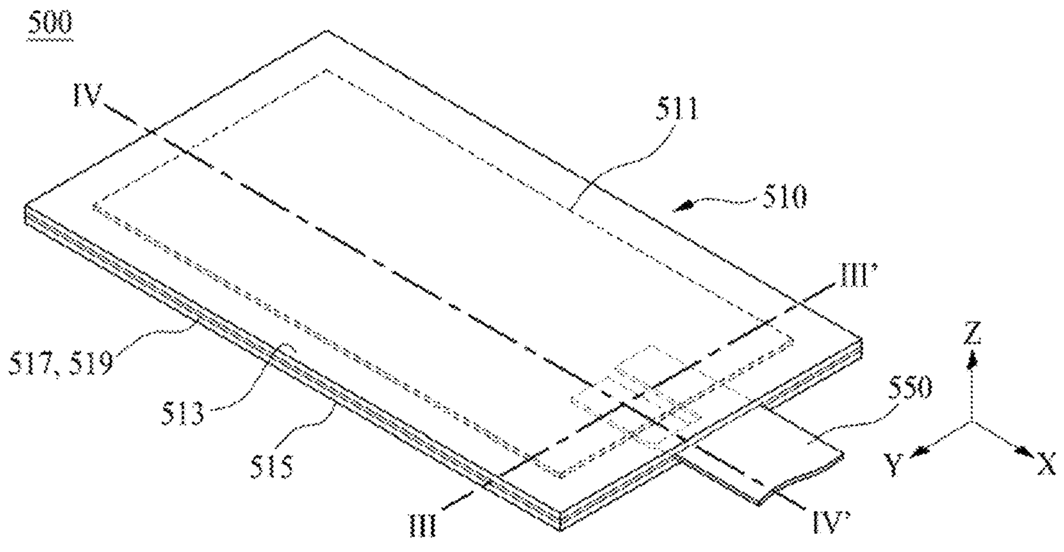
FIG. 12 illustrates a vibration apparatus according to an aspect of the present disclosure.
Figure 13:
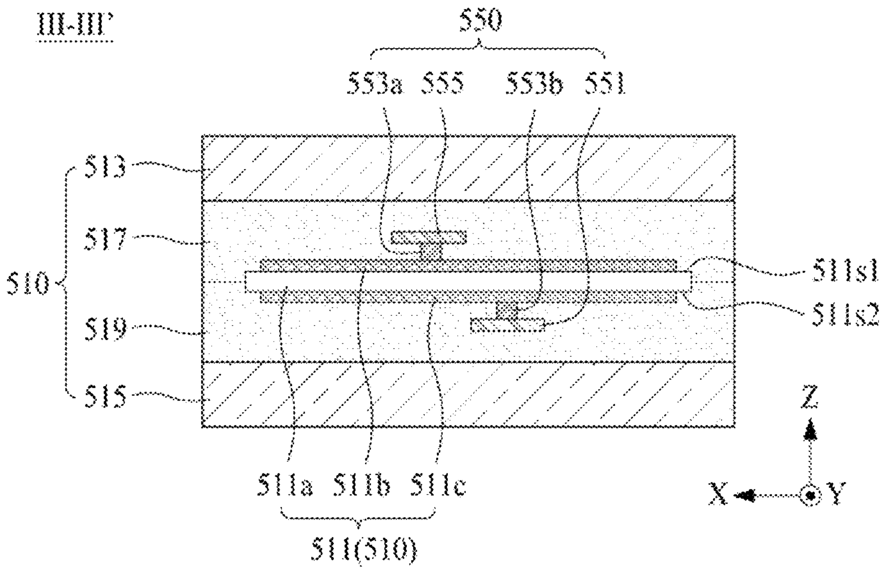
FIG. 13 is a cross-sectional view taken along line III-III' illustrated in FIG. 12 according to an aspect of the present disclosure.
Figure 14:
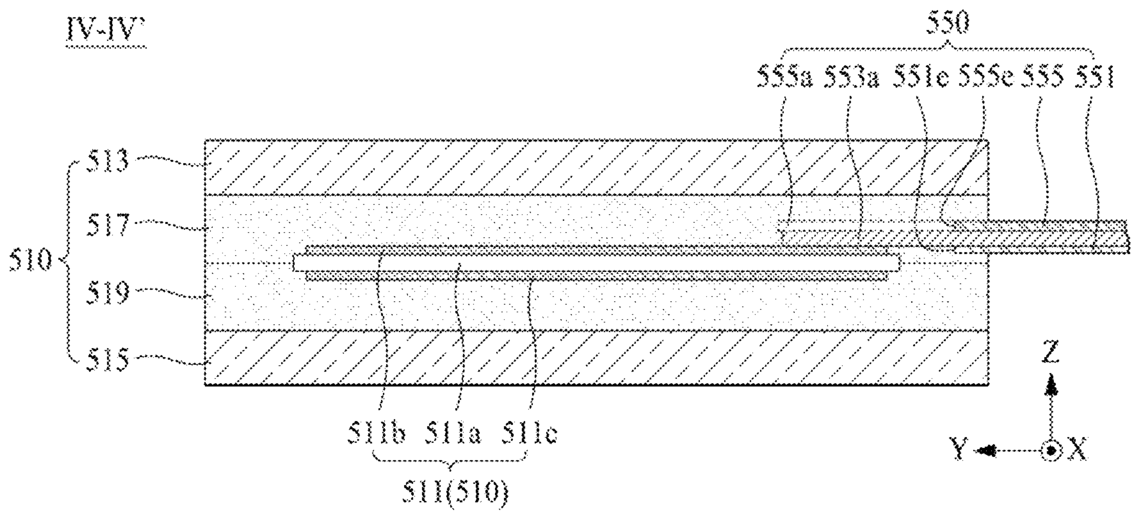
FIG. 14 is a cross-sectional view taken along line IV-IV' illustrated in FIG. 12 according to an aspect of the present disclosure.

FIG. 12 illustrates a vibration apparatus according to an aspect of the present disclosure. FIG. 13 is a cross-sectional view taken along line III-III' illustrated in FIG. 12 according to an aspect of the present disclosure. FIG. 14 is a cross-sectional view taken along line IV-IV' illustrated in FIG. 12 according to an aspect of the present disclosure. FIGS. 12 to 14 illustrate a vibration apparatus 500 according to an aspect of the present disclosure described above with reference to FIGS. 1 to 11.

With reference to FIGS. 12 to 14, the vibration apparatus 500 according to an aspect of the present disclosure may include one or more vibration generator.

The vibration apparatus 500 or one or more vibration generator may include a vibration generating part 510 including a piezoelectric material. The vibration generating part 510 may be configured to vibrate based on a driving signal (or sound signal or a voice signal). For example, the vibration generating part 510 may be a vibration device, a vibration generating device, a vibration film, a vibration generating film, a vibrator, a vibration generator, an active vibrator, an active vibration generator, an active vibration member, or the like, but aspects of the present disclosure are not limited thereto.

The vibration generating part 510 according to an aspect of the present disclosure may include a vibration part 511. The vibration part 511 may be configured to vibrate by a piezoelectric effect based on a driving signal. The vibration part 511 may include at least one or more of a piezoelectric inorganic material and a piezoelectric organic material. For example, the vibration part 511 may be a piezoelectric device, a piezoelectric device part, a piezoelectric device layer, a piezoelectric structure, a piezoelectric vibration part, a piezoelectric vibration layer, or the like, but aspects of the present disclosure are not limited thereto.

The vibration generating part 510 or the vibration part 511 according to an aspect of the present disclosure may include a vibration layer 511*a*, a first electrode layer 511*b*, and a second electrode layer 511*c*.

The vibration layer 511*a* may include a piezoelectric material or an electroactive material which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 511*a* may be a piezoelectric layer, a piezoelectric material layer, an electroactive layer, a piezoelectric composite layer, a piezoelectric composite, a piezoelectric ceramic composite, or the like, but aspects of the present disclosure are not limited thereto.

The vibration layer 511*a* may be configured as a ceramic-based material for implementing a relatively high vibration, or may be configured as a piezoelectric ceramic having a perovskite-based crystalline structure. The perovskite crystalline structure may have a piezoelectric effect and/or an inverse piezoelectric effect and may be a plate-shaped structure having an orientation.

The piezoelectric ceramic may be configured as a single crystalline ceramic having a crystalline structure, or may be configured as a ceramic material having a polycrystalline structure or polycrystalline ceramic. A piezoelectric material of the single crystalline ceramic may include $\alpha$-$AlPO_4$, $\alpha$-$SiO_2$, $LiNbO_3$, $Tb_2(MoO_4)_3$, $Li_2B_4O_7$, or ZnO, but aspects of the present disclosure are not limited thereto. A piezoelectric material of the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but aspects of the present disclosure are not limited thereto. For example, the vibration layer 511*a* may include at least one or more of calcium titanate ($CaTiO_3$), barium titanate ($BaTiO_3$), and strontium titanate ($SrTiO_3$), without lead (Pb), but aspects of the present disclosure are not limited thereto.

The first electrode layer 511*b* may be disposed at a first surface (or an upper surface or a front surface) 511*s*1 of the vibration layer 511*a*. The first electrode layer 511*b* may have the same size as that of the vibration layer 511*a*, or may have a size which is smaller than that of the vibration layer 511*a*.

The second electrode layer 511*c* may be disposed at a second surface (or a lower surface or a rear surface) 511*s*2 which is opposite to or different from the first surface 511*s*1 of the vibration layer 511*a*. The second electrode layer 511*c* may have the same size as that of the vibration layer 511*a*, or may have a size which is smaller than that of the vibration layer 511*a*. For example, the second electrode layer 511*c* may have a same shape as that of the vibration layer 511*a*, but aspects of the present disclosure are not limited thereto.

According to an aspect of the present disclosure, to prevent electrical short circuit between the first electrode layer 511*b* and the second electrode layer 511*c*, each of the first electrode layer 511*b* and the second electrode layer 511*c* may be formed at the other portion, except a periphery portion, of the vibration layer 511*a*. For example, the first electrode layer 511*b* may be formed at an entire first surface 511*s*1, other than a periphery portion, of the vibration layer 511*a*. For example, the second electrode layer 511*c* may be formed at an entire second surface 511*s*2, other than a periphery portion, of the vibration layer 511*a*. For example, a distance between a lateral surface (or a sidewall) of each of the first electrode layer 511*b* and the second electrode layer 511*c* and a lateral surface (or a sidewall) of the vibration layer 511*a* may be at least 0.5 mm or more. For example, the distance between the lateral surface of each of the first electrode layer 511*b* and the second electrode layer 511*c* and the lateral surface of the vibration layer 511*a* may be at least 1 mm or more, but aspects of the present disclosure are not limited thereto.

One or more of the first electrode layer 511*b* and the second electrode layer 511*c* according to an aspect of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or silver (Ag) including glass frit, or the like, or may be made of an alloy thereof, but aspects of the present disclosure are not limited thereto. For example, to enhance an electrical characteristic and/or a vibration characteristic of the vibration layer 511*a*, each of the first electrode layer 511*b* and the second electrode layer 511*c* may include silver (Ag) having a low resistivity. For example, carbon may be carbon black, ketjen black, carbon nanotube, and a carbon material including graphite, but aspects of the present disclosure are not limited thereto.

In the first electrode layer 511*b* and the second electrode layer 511*c* including silver (Ag) containing the glass frit, a content of glass frit may be about 1 wt % to about 12 wt %, but aspects of the present disclosure are not limited thereto. The glass frit may include PbO or $Bi_2O_3$-based material, but aspects of the present disclosure are not limited thereto.

The vibration layer 511*a* may be polarized (or poling) by a certain voltage applied to the first electrode layer 511*b* and the second electrode layer 511*c* in a certain temperature atmosphere, or a temperature atmosphere that may be changed from a high temperature to a room temperature, but aspects of the present disclosure are not limited thereto. For example, a polarization direction (or a poling direction) formed in the vibration layer 511*a* may be formed or aligned (or arranged) from the first electrode layer 511*b* to the second electrode layer 511*c*, but is not limited thereto, and a polarization direction (or a poling direction) formed in the vibration layer 511*a* may be formed or aligned (or arranged) from the second electrode layer 511*c* to the first electrode layer 511*b*.

The vibration layer 511*a* may alternately and repeatedly contract and/or expand based on an inverse piezoelectric effect according to a driving signal applied to the first electrode layer 511*b* and the second electrode layer 511*c* from the outside to vibrate. For example, the vibration layer 511*a* may vibrate in a vertical direction (or thickness direction) and in a planar direction by the signal applied to the first electrode layer 511*b* and the second electrode layer 511*c*. The vibration layer 511*a* may be displaced (or vibrated or driven) by contraction and/or expansion of the planar direction, thereby improving sound characteristic and/or sound pressure level characteristic of the vibration generating part 510 or the vibration apparatus 500.

The vibration apparatus 500 or the vibration generating part 510 according to an aspect of the present disclosure may further include a first cover member 513 and a second cover member 515.

The first cover member 513 may be disposed at a first surface of the vibration part 511. For example, the first cover member 513 may be configured to cover the first electrode layer 511*b* of the vibration part 511. For example, the first cover member 513 may be configured to have a larger size than the vibration part 511. The first cover member 513 may be configured to protect the first surface of the vibration part 511 and the first electrode layer 511*b*.

The second cover member 515 may be disposed at a second surface of the vibration part 511. For example, the second cover member 515 may be configured to cover the second electrode layer 511*c* of the vibration part 511. For example, the second cover member 515 may be configured to have a larger size than the vibration part 511 and may be configured to have the same size as the first cover member 513. The second cover member 515 may be configured to protect the second surface of the vibration part 511 and the second electrode layer 511*c*.

Each of the first cover member 513 and the second cover member 515 according to an aspect of the present disclosure may include one or more materials of plastic, fiber, cloth, paper, leather, carbon, and wood, but aspects of the present disclosure are not limited thereto. For example, each of the first cover member 513 and the second cover member 515 may include the same material or different material. For example, each of the first cover member 513 and the second cover member 515 may be a polyimide film or a polyethylene terephthalate film, but aspects of the present disclosure are not limited thereto.

One or more of the first cover member 513 and the second cover member 515 according to an aspect of the present disclosure may include an adhesive member. For example, one or more of the first cover member 513 and the second cover member 515 may include an adhesive member which is coupled to or attached on the vibration part 511 and a protection member (or a stripping member) which covers or protects the adhesive member. For example, the adhesive member may include an electrical insulation material which has adhesive properties and is capable of compression and decompression. For example, the first cover member 513 may include an adhesive member which is coupled to or attached on the vibration part 511 and a protection member (or a stripping member or a delamination member) which covers or protects the adhesive member.

The first cover member 513 may be connected or coupled to the first surface of the vibration part 511 or the first electrode layer 511*b* by a first adhesive layer 517. For example, the first cover member 513 may be connected or coupled to the first surface of the vibration part 511 or the first electrode layer 511*b* by a film laminating process using the first adhesive layer 517.

The second cover member 515 may be connected or coupled to the second surface of the vibration part 511 or the second electrode layer 511*c* by a second adhesive layer 519. For example, the second cover member 515 may be connected or coupled to the second surface of the vibration part 511 or the second electrode layer 511*c* by a film laminating process using the second adhesive layer 519.

Each of the first adhesive layer 517 and second adhesive layer 519 according to an aspect of the present disclosure may include an electrically insulating material which has adhesiveness and is capable of compression and decompression. For example, each of the first adhesive layer 517 and the second adhesive layer 519 may include an epoxy resin, an acrylic resin, a silicone resin, or a urethane resin, but aspects of the present disclosure are not limited thereto.

The first adhesive layer 517 and second adhesive layer 519 may be configured between the first cover member 513 and the second cover member 515 to surround the vibration part 511. For example, one or more of the first adhesive layer 517 and second adhesive layer 519 may be configured to surround the vibration part 511.

The vibration apparatus 500 (or one or more vibration generators) according to an aspect of the present disclosure may further include a signal supply member 550.

The signal supply member 550 may be configured to supply the driving signal supplied from a vibration driving circuit to the vibration generating part 510. The signal supply member 550 may be configured to be electrically connected to the vibration part 511 at one side of the vibration generating part 510. The signal supply member 550 may be configured to be electrically connected to the first electrode layer 511*b* and the second electrode layer 511*c* of the vibration part 511.

A portion of the signal supply member 550 may be accommodated (or inserted) between the first cover member 513 and the second cover member 515. An end portion (or a distal end portion) of the signal supply member 550 may be disposed or inserted (or accommodated) between one periphery portion of the first cover member 513 and one periphery portion of the second cover member 515. The one periphery portion of the first cover member 513 and the one periphery portion of the second cover member 515 may accommodate or vertically cover the end portion (or the distal end portion or one side) of the signal supply member 550. Accordingly, the signal supply member 550 may be integrated into the vibration generating part 510. For example, the vibration apparatus 500 according to an aspect of the present disclosure may be a vibration apparatus in which the signal supply member 550 is integrated. For example, the signal supply member 550 may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but aspects of the present disclosure are not limited thereto.

The signal supply member 550 according to an aspect of the present disclosure may include a base member 551 and a plurality of signal lines 553*a* and 553*b*. For example, the signal supply member 550 may include a base member 551, a first signal line 553*a*, and a second signal line 553*b*.

The base member 551 may include a transparent or opaque plastic material. For example, the base member 551 may be implemented as one or more of resins including a fluorine resin, a polyimide-based resin, a polyurethane-based resin, a polyester resin-based, a polyethylene-based resin, and a polypropylene-based resin, but aspects of the present disclosure are not limited thereto.

The base member 551 may have a certain width along a first direction X and may be extended long along a second direction Y intersecting with the first direction X.

The first and second signal lines 553*a* and 553*b* may be disposed at the first surface of the base member 551 in parallel with the second direction Y, and may be spaced apart from each other or electrically separated from each other in the first direction X. The first and second signal lines 553*a* and 553*b* may be disposed in parallel to each other at the first surface of the base member 551. For example, the first and second signal lines 553*a* and 553*b* may be implemented in a line shape by patterning of a metal layer (or a conductive layer) formed or deposited at the first surface of the base member 551.

End portions (or distal end portions or one sides) of the first and second signal lines 553*a* and 553*b* may be separated from each other, and thus, may be individually curved or bent.

The end portion (or a distal end portion) of the first signal line 553*a* may be electrically connected to the first electrode layer 511*b* of the vibration part 511. For example, the end portion of the first signal line 553*a* may be electrically connected to at least a portion of the first electrode layer 511*b* of the vibration part 511 at one periphery portion of the first cover member 513. For example, the end portion (or the distal end portion or one side) of the first signal line 553*a* may be electrically and directly connected to the first electrode layer 511*b* of the vibration part 511. For example, the end portion (or the distal end portion or the one side) of the first signal line 553*a* may be directly connected to or directly contact the first electrode layer 511*b* of the vibration part 511. For example, the end portion of the first signal line 553*a* may be electrically connected to the first electrode layer 511*b* by a conductive double-sided tape. Accordingly, the first signal line 553*a* may transfer a first driving signal, suppled from a vibration driver, to the first electrode layer 511*b* of the vibration part 511.

The end portion (or a distal end portion or one side) of the second signal line 553*b* may be electrically connected to the second electrode layer 511*c* of the vibration part 511. For example, the end portion of the second signal line 553*b* may be electrically connected to at least a portion of the second electrode layer 511*c* of the vibration part 511 at one periphery portion of the second cover member 515. For example, the end portion of the second signal line 553*b* may be electrically and directly connected to at least a portion of the second electrode layer 511*c* of the vibration part 511. For example, the end portion of the second signal line 553*b* may be directly connected to or directly contact the second electrode layer 511*c* of the vibration part 511. For example, the end portion of the second signal line 553*b* may be electrically connected to the second electrode layer 511*c* by a conductive double-sided tape. Accordingly, the second signal line 553*b* may transfer a second driving signal, suppled from the vibration driver, to the second electrode layer 511*c* of the vibration part 511.

The signal supply member 550 according to an aspect of the present disclosure may further include an insulation layer 555.

The insulation layer 555 may be disposed at the first surface of the base member 551 to cover each of the first signal line 553*a* and the second signal line 553*b* other than the end portion (or one side) of the signal supply member 550.

An end portion (or one side) of the signal supply member 550 including an end portion (or one side) of the base member 551 and an end portion (or one side) 555*a* of the insulation layer 555 may be inserted (or accommodated) between the first surface of the vibration part 511 and the first cover member 513 and may be inserted or fixed between the first surface of the vibration part 511 and the first cover member 513 by the first adhesive layer 517. For example, the end portion (or the one side) of the signal supply member 550 which is inserted (or accommodated) between the first surface of the vibration part 511 and the first cover member 513 may be inserted (or accommodated) or fixed between the first surface of the vibration part 511 and the first cover member 513 by a film laminating process using the first adhesive layer 517 and/or the second adhesive layer 519. Accordingly, the end portion (or the one side) of the first signal line 553*a* may be maintained with being electrically connected to the first electrode layer 511*b* of the vibration part 511, and the end portion (or the one side) of the second signal line 553*b* may be maintained with being electrically connected to the second electrode layer 511*c* of the vibration part 511. Further, the end portion (or the one side) of the signal supply member 550 may be inserted (or accommodated) and fixed between the vibration part 511 and the first cover member 513, and thus, a contact defect (or bad connection) between the vibration generating part 510 and the signal supply member 550 caused by the movement of the signal supply member 550 may be prevented.

In the signal supply member 550 according to an aspect of the present disclosure, each of the end portion (or the one side) of the base member 551 and an end portion (or one side) 555*a* of the insulation layer 555 may be removed. For example, each of the end portion of the first signal line 553*a* and the end portion of the second signal line 553*b* may be exposed at the outside without being supported or covered by each of the end portion (or the one side) of the base member 551 and the end portion (or the one side) 555*a* of the insulation layer 555. For example, the end portion of each of the first and second signal lines 553*a* and 553*b* may protrude (or extend) to have a certain length from an end 551*e* of the base member 551 or an end 555*e* of the insulation layer 555. Accordingly, each of the end portion (or the distal end portion or the one side) of each of the first and second signal lines 553*a* and 553*b* may be individually or independently curved (or bent).

Each of the first and second signal lines 553*a* and 553*b* may be disposed only between the base member 551 and the insulation layer 555. The end portion (or the one side) of the first signal line 553*a*, which is not supported by the end portion (or the one side) of the base member 551 and the end portion 555*a* of the insulation layer 555, may be directly connected to or directly contact the first electrode layer 511*b* of the vibration part 511. The end of the second signal line 553*b*, which is not supported by the end portion (or the one side) of the base member 551 and the end portion (or the one side) 555*a* of the insulation layer 555, may be directly connected to or directly contact the second electrode layer 511*c* of the vibration part 511.

According to an aspect of the present disclosure, a portion of the signal supply member 550 (or a portion of the base member 551) may be disposed or inserted (or accommodated) between the first cover member 513 and the second cover member 515, and thus, the signal supply member 550 may be integrated into (configured as one body with) the vibration generating part 510. Accordingly, the vibration generating part 510 and the signal supply member 550 may be configured as one part (or one component), and thus, an effect of uni-materialization may be obtained.

According to an aspect of the present disclosure, the first signal line 553*a* and the second signal line 553*b* of the signal supply member 550 may be integrated into (configured as one body with) the vibration generating part 510, and thus, a soldering process for an electrical connection between the vibration generating part 510 and the signal supply member 550 may not be needed. Accordingly, a manufacturing process and a structure of the vibration apparatus 500 may be simplified, and thus, a hazardous process may be reduced.

Figure 15:
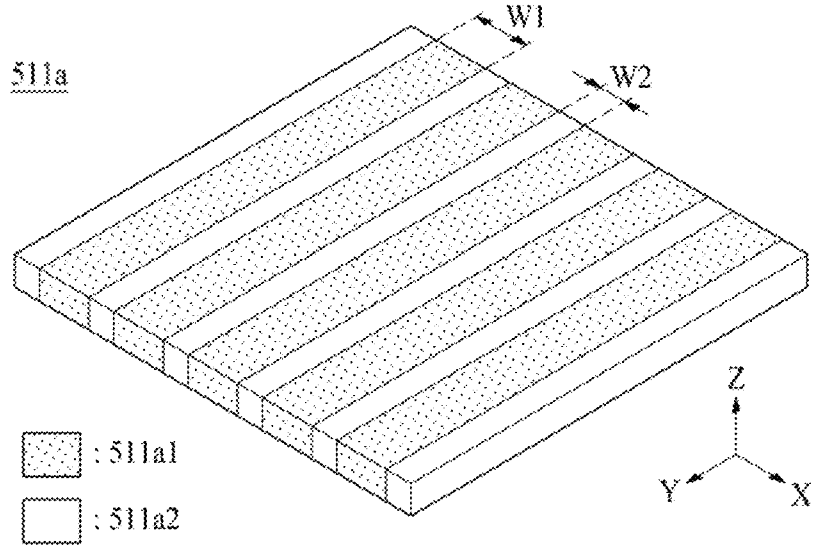
FIG. 15 illustrates a vibration layer according to another aspect of the present disclosure.

FIG. 15 illustrates a vibration layer according to another aspect of the present disclosure. FIG. 15 illustrates another aspect of the vibration layer according to an aspect of the present disclosure described above with reference to FIGS. 12 to 14.

With reference to FIGS. 13 and 15, the vibration layer 511*a* according to another aspect of the present disclosure may include a plurality of first portions 511*a*1 and a plurality of second portions 511*a*2. For example, the plurality of first portions 511*a*1 and the plurality of second portions 511*a*2 may be alternately and repeatedly disposed along a first direction X (or a second direction Y). For example, the first direction X may be a horizontal direction (or a widthwise direction) of the vibration layer 511*a*, and the second direction Y may be a vertical direction (or a lengthwise direction) of the vibration layer 511*a* intersecting with the first direction X, but aspects of the present disclosure are not limited thereto. For example, the first direction X may be the vertical direction (or the lengthwise direction) of the vibration layer 511*a*, and the second direction Y may be the horizontal direction (or the widthwise direction) of the vibration layer 511*a*.

Each of the plurality of first portions 511*a*1 may include an inorganic material having a piezoelectric effect (or a piezoelectric characteristic). For example, each of the plurality of first portions 511*a*1 may include at least one or more of a piezoelectric inorganic material and a piezoelectric organic material. For example, each of the plurality of first portions 511*a*1 may be an inorganic portion, an inorganic material portion, a piezoelectric portion, a piezoelectric material portion, or an electroactive portion, but aspects of the present disclosure are not limited thereto.

According to an aspect of the present disclosure, each of the plurality of first portions 511*a*1 may have a first width W1 parallel to the first direction X and may be extended along the second direction Y intersecting with the first direction X. Each of the plurality of first portions 511*a*1 may include a material which is be substantially the same as the vibration layer 511*a* described above with reference to FIGS. 13 and 14, and thus, repeated descriptions thereof are omitted.

Each of the plurality of second portions 511*a*2 may be disposed between the plurality of first portions 511*a*1. For example, each of the plurality of first portions 511*a*1 may be disposed between two adjacent second portions 511*a*2 of the plurality of second portions 511*a*2. Each of the plurality of second portions 511*a*2 may have a second width W2 parallel to the first direction X (or the second direction Y) and may be extended along the second direction Y (or the first direction X). The first width W1 may be the same as or different from the second width W2. For example, the first width W1 may be greater than the second width W2. For example, the first portion 511*a*1 and the second portion 511*a*2 may include a line shape or a stripe shape which has the same size or different sizes.

Each of the plurality of second portions 511*a*2 may be configured to fill a gap between two adjacent first portions 511*a*1 of the plurality of first portions 511*a*1. Each of the plurality of second portions 511*a*2 may be configured to fill a gap between two adjacent first portions 511*a*1 of the plurality of first portions 511*a*1, and thus, may be connected to or attached on lateral surfaces of the first portion 511*a*1 adjacent thereto. According to an aspect of the present disclosure, each of the plurality of first portions 511*a*1 and the plurality of second portions 511*a*2 may be disposed (or arranged) at the same plane (or the same layer) in parallel with each other. Therefore, the vibration layer 511*a* may be expanded to a desired size or length by a lateral coupling (or connection) of the first portion 511*a*1 and the second portion 511*a*2.

According to an aspect of the present disclosure, each of the plurality of second portions 511*a*2 may absorb an impact applied to the first portions 511*a*1, and thus, may enhance the durability of the first portions 511*a*1 and provide flexibility to the vibration layer 511*a*. Each of the plurality of second portions 511*a*2 may include an organic material having a ductile characteristic. For example, each of the plurality of second portions 511*a*2 may include one or more of an epoxy-based polymer, an acrylic-based polymer, and a silicone-based polymer, but aspects of the present disclosure are not limited thereto. For example, each of the plurality of second portions 511*a*2 may be an organic portion, an organic material portion, an adhesive portion, a stretch portion, a bending portion, a damping portion, or a ductile portion, but aspects of the present disclosure are not limited thereto.

A first surface of each of the plurality of first portions 511*a*1 and the plurality of second portions 511*a*2 may be connected to the first electrode layer 511*b* in common. A second surface of each of the plurality of first portions 511*a*1 and the plurality of second portions 511*a*2 may be connected to the second electrode layer 511*c* in common.

The plurality of first portions 511*a*1 and the plurality of second portion 511*a*2 may be disposed on (or connected to) the same plane, and thus, the vibration layer 511*a* according to another aspect of the present disclosure may have a single thin film-type. Accordingly, the vibration part 511 or the vibration generating part 510 including the vibration layer 511*a* according to another aspect of the present disclosure may vibrate in vertically (or up and down) direction by the first portion 511*a*1 having a vibration characteristic and may be bent in a curved shape by the second portion 511*a*2 having flexibility.

Figure 16:
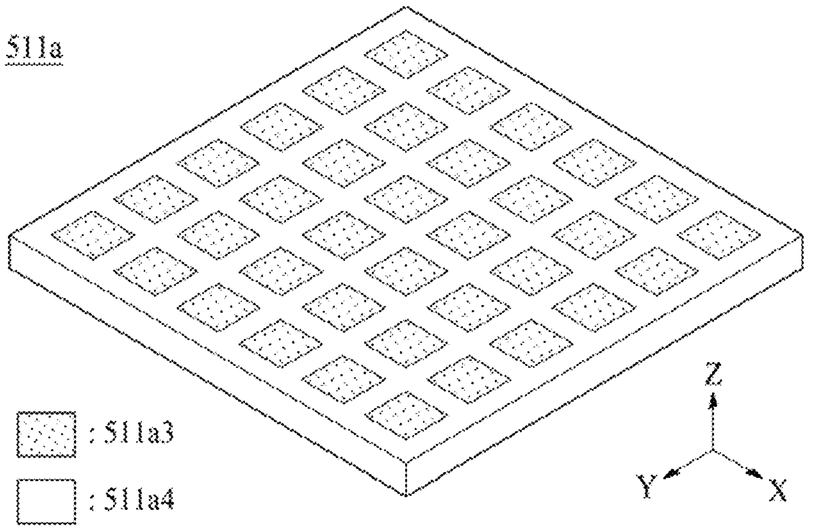
FIG. 16 illustrates a vibration layer according to another aspect of the present disclosure.

FIG. 16 illustrates a vibration layer according to another aspect of the present disclosure. FIG. 16 illustrates another aspect of the vibration layer according to an aspect of the present disclosure described above with reference to FIGS. 12 to 14.

With reference to FIGS. 13 and 16, the vibration layer 511*a* according to another aspect of the present disclosure may include a plurality of first portions 511*a*3 and a second portion 511*a*4 disposed between the plurality of first portions 511*a*3.

Each of the plurality of first portions 511*a*3 may be disposed to be spaced apart from one another along each of the first direction X and the second direction Y. For example, each of the plurality of first portions 511*a*3 may have a hexahedral shape having the same size and may be disposed in a lattice shape, but aspects of the present disclosure are not limited thereto. For example, each of the plurality of first portions 511*a*3 may have a circular shape plate, an oval shape plate, or a polygonal shape plate, which have the same size as each other, but aspects of the present disclosure are not limited thereto.

Each of the plurality of first portions 511*a*3 may include a material which is be substantially the same as the first portion 511*a*1 described above with reference to FIG. 15, and thus, repeated descriptions thereof are omitted.

The second portion 511*a*4 may be disposed between the plurality of first portions 511*a*3 along each of the first direction X and the second direction Y. The second portion 511*a*4 may be configured to fill a gap between two adjacent first portions 511*a*3 or to surround each of the plurality of first portions 511*a*3, and thus, the second portion 511*a*4 may be connected to or attached on the first portion 511*a*3 adjacent thereto. The second portion 511*a*4 may include a material which is be substantially the same as the second portion 511*a*2 described above with reference to FIG. 15, and thus, repeated descriptions thereof are omitted.

A first surface of each of the plurality of first portions 511*a*3 and the second portions 511*a*4 may be connected to the first electrode layer 511*b* in common. A second surface of each of the plurality of first portions 511*a*3 and the second portions 511*a*4 may be connected to the second electrode layer 511*c* in common.

The plurality of first portions 511*a*3 and the second portion 511*a*4 may be disposed on (or connected to) the same plane, and thus, the vibration layer 511*a* according to another aspect of the present disclosure may have a single thin film-type. Accordingly, the vibration part 511 or the vibration generating part 510 including the vibration layer 511*a* according to another aspect of the present disclosure may vibrate in vertically (or up and down) direction by the first portion 511*a*3 having a vibration characteristic and may be bent in a curved shape by the second portion 511*a*4 having flexibility.

Figure 17:
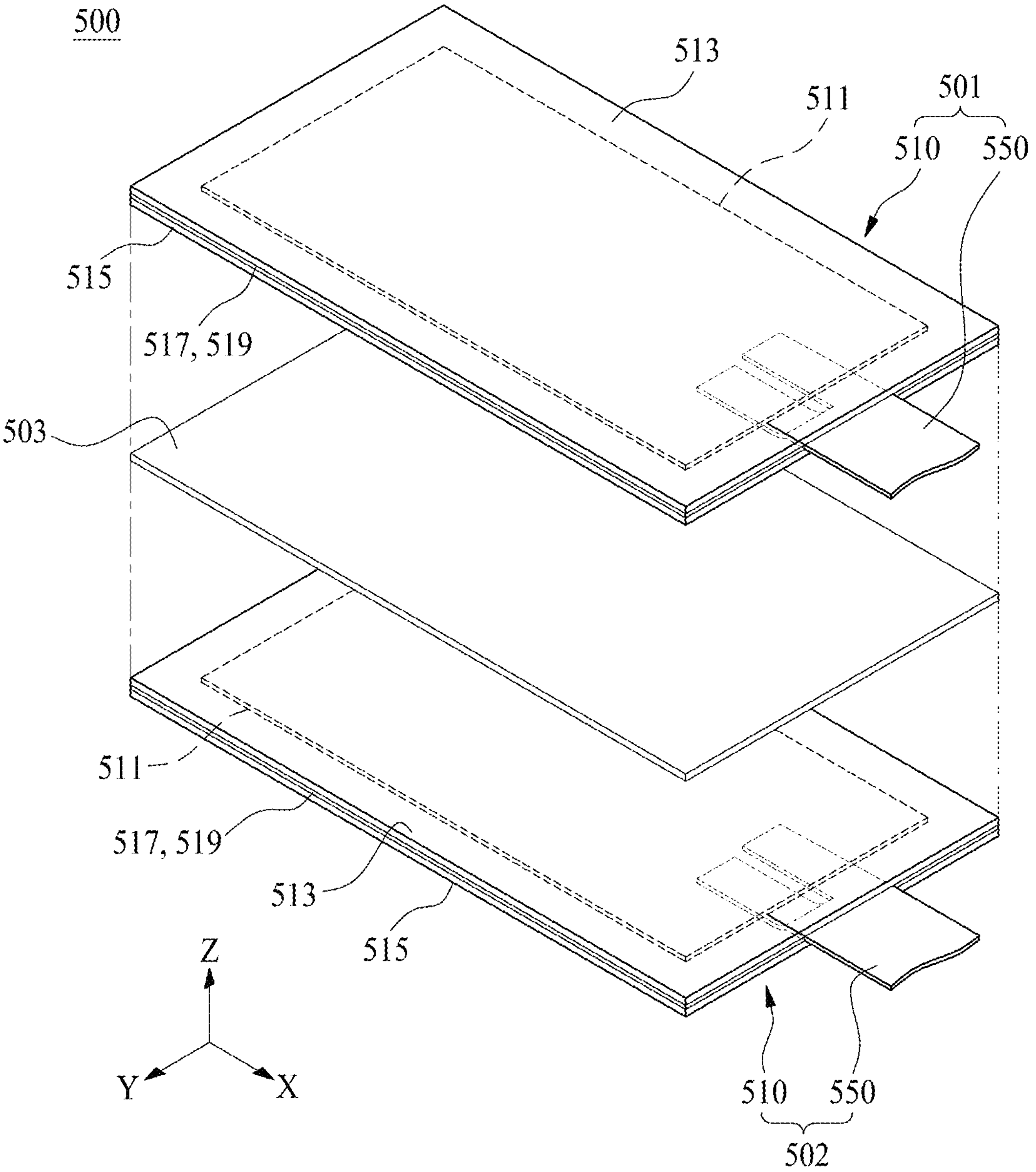
FIG. 17 is an exploded perspective view illustrating an apparatus according to another aspect of the present disclosure.

FIG. 17 is an exploded perspective view illustrating an apparatus according to another aspect of the present disclosure. FIG. 17 illustrates a vibration apparatus according to an aspect of the present disclosure described above with reference to FIGS. 1 to 11.

With reference to FIGS. 2 and 17, the vibration apparatus 500 according to another aspect of the present disclosure a plurality of vibration generators 501 and 502, and an adhesive member 503.

The plurality of vibration generators 501 and 502 may be configured to include a piezoelectric material. The plurality of vibration generators 501 and 502 may overlap with or be stacked with each other to be displaced (or driven or vibrated) in the same direction to maximize an amplitude displacement of the vibration apparatus 500 or an amplitude displacement of the vibration member 100. For example, the plurality of vibration generators 501 and 502 may have substantially the same size, but aspects of the present disclosure are not limited thereto. For example, the plurality of vibration generators 501 and 502 may have substantially the same size within an error range of a manufacturing process, but aspects of the present disclosure are not limited thereto. Therefore, the plurality of vibration generators 501 and 502 may maximize an amplitude displacement of the vibration apparatus 500 and/or an amplitude displacement of the vibration member 100.

According to an aspect of the present disclosure, when at least one of the plurality of vibration generators 501 and 502 has a different size departing from an error range of a manufacturing process, the displacement directions and the amplitude displacements of the plurality of vibration generators 501 and 502 may not match with each other, and thus, the amplitude displacement of the vibration apparatus 500 may not be maximized. For example, when at least one of the plurality of vibration generators 501 and 502 is displaced in a different direction, the displacement directions of the plurality of vibration generators 501 and 502 may not match with each other, and thus, the amplitude displacement of the vibration apparatus 500 may not be maximized.

The vibration apparatus 500 according to another aspect of the present disclosure may include two or more vibration generators 501 and 502 which are stacked to be displaced in the same direction. In the following description, an example where the vibration apparatus 500 includes first and second vibration generators 501 and 502 will be described.

According to an aspect of the present disclosure, the first vibration generator 501 may be connected to or disposed at a second surface 100*b* of the vibration member 100 by a connection member 400. The second vibration generator 502 may be disposed at or attached on the first vibration generator 501 by an adhesive member 503 (or a second connection member).

Each of the plurality of vibration generators 501 and 502 may include a vibration generating part 510 and a signal supply member 550. Each of the vibration generating part 510 and the signal supply member 550 may be the same as or substantially the same as the vibration generating part 510 and the signal supply member 550 described above with reference to FIGS. 12 to 16, respectively, and are referred to by like reference numerals and repeated descriptions thereof are omitted.

A plurality of first portions which is in the first vibration generator 501 and a plurality of first portions which is in the second vibration generator 502 may have the same size. The plurality of second portions which is in the first vibration generator 501 and a plurality of second portions which is in the second vibration generator 502 may have the same size. The plurality of first portions which is in the first vibration generator 501 and the plurality of first portions which is in the second vibration generator 502 may substantially overlap or stack without being staggered. Therefore, the plurality of first portions which is in the first vibration generator 501 and the plurality of first portions which is in the second vibration generator 502 may have the same size and may be configured in a stack structure where the first portions are stacked without being staggered, and thus, the amount of displacement or an amplitude displacement of the vibration apparatus 500 may be maximized or increased.

The adhesive member 503 may be disposed between the plurality of vibration generators 501 and 502. The adhesive member 503 may be disposed between the first vibration generator 501 and the second vibration generator 502. For example, the adhesive member 503 may be disposed or connected between the second cover member 515 of the first vibration generator 501 and the first cover member 513 of the second vibration generator 502.

The adhesive member 503 according to an aspect of the present disclosure may be configured as a material including an adhesive layer which is good in attaching force or adhesive force, with respect to each of the plurality of vibration generators 501 and 502. For example, the adhesive member 503 may include a foam pad, a double-sided tape, a double-sided foam tape, a double-sided foam pad, an adhesive, or the like, but aspects of the present disclosure are not limited thereto. For example, an adhesive layer of the adhesive member 503 may include epoxy, acrylic, silicone, or urethane, but aspects of the present disclosure are not limited thereto. The adhesive layer of the adhesive member 503 may include a urethane-based material (or substance) having relatively ductile characteristic than that of the acrylic-based material. Accordingly, the vibration loss caused by displacement interference between the plurality of vibration generators 501 and 502 may be minimized, or each of the plurality of vibration generators 501 and 502 may be freely displaced (or vibrated or driven).

The vibration apparatus 500 according to another aspect of the present disclosure may include the plurality of vibration generators 501 and 502 which are stacked to vibrate (or displace or drive) in the same direction, and thus, the amount of displacement and/or an amplitude displacement may be maximized or increased. Accordingly, the amount of displacement (or a bending force) or an amplitude displacement of a vibration member 100 may be maximized or increased.

Figure 18A:
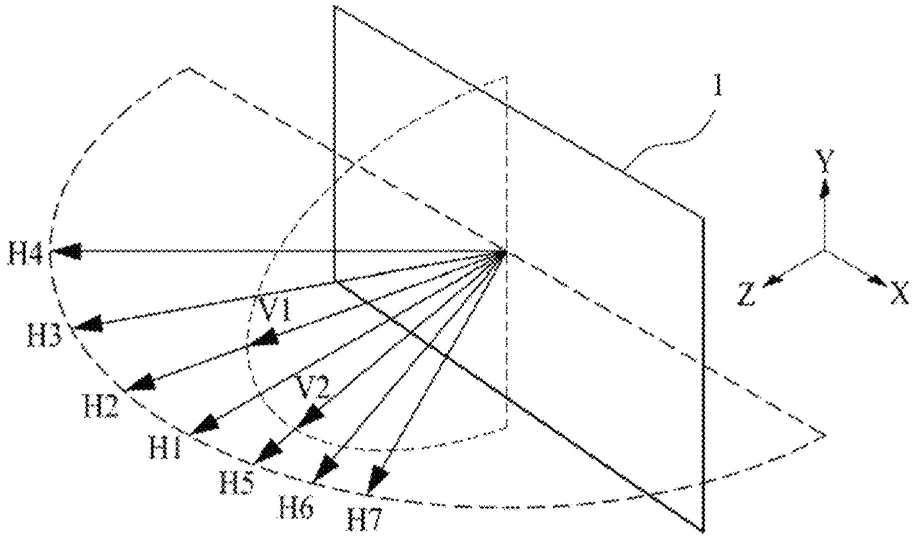
FIG. 18A illustrates first to seventh horizontal regions and first and second vertical regions with respect to a front surface of an apparatus according to an experimental example.
Figure 18B:
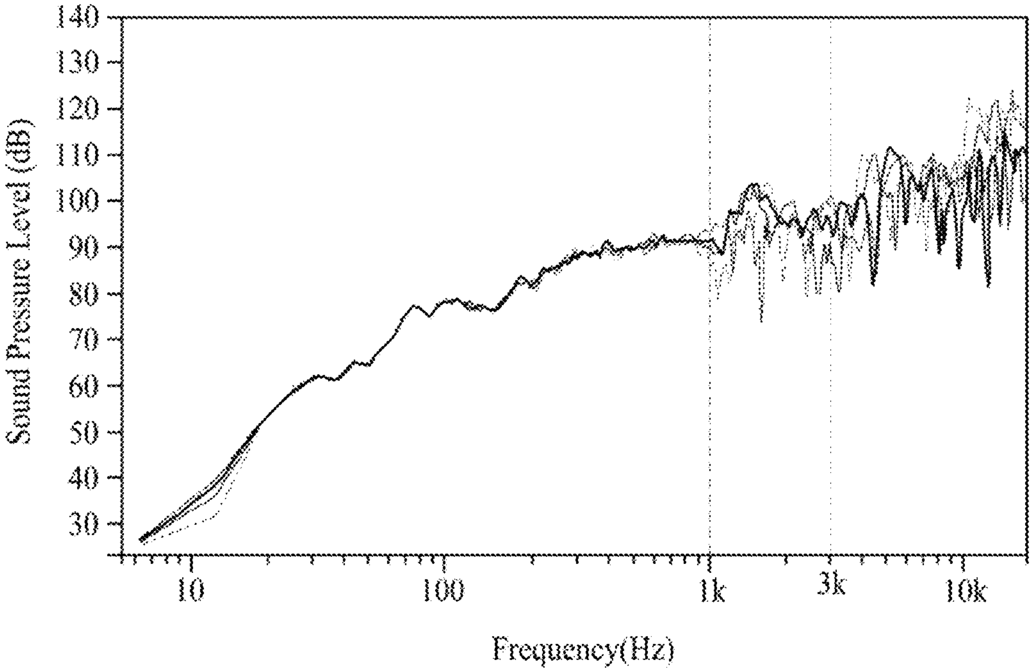
FIG. 18B illustrates a frequency-based sound pressure level with respect to each of the first to fourth horizontal regions illustrated in FIG. 18A.
Figure 18C:
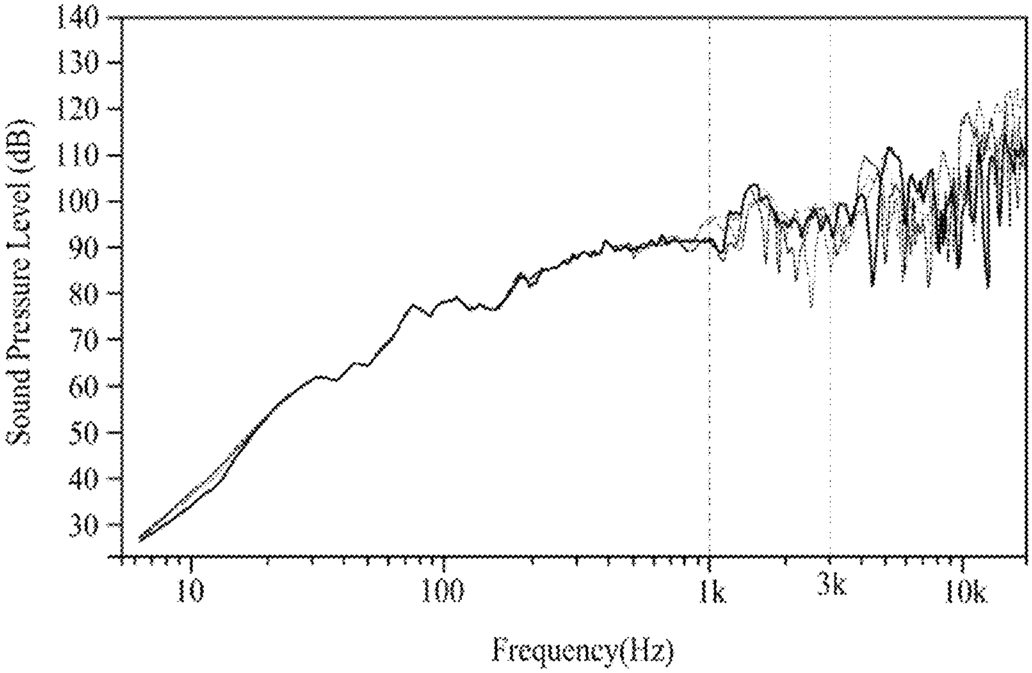
FIG. 18C illustrates a frequency-based sound pressure level with respect to each of the second vertical region and the fifth to seventh horizontal regions illustrated in FIG. 18A.
Figure 18D:
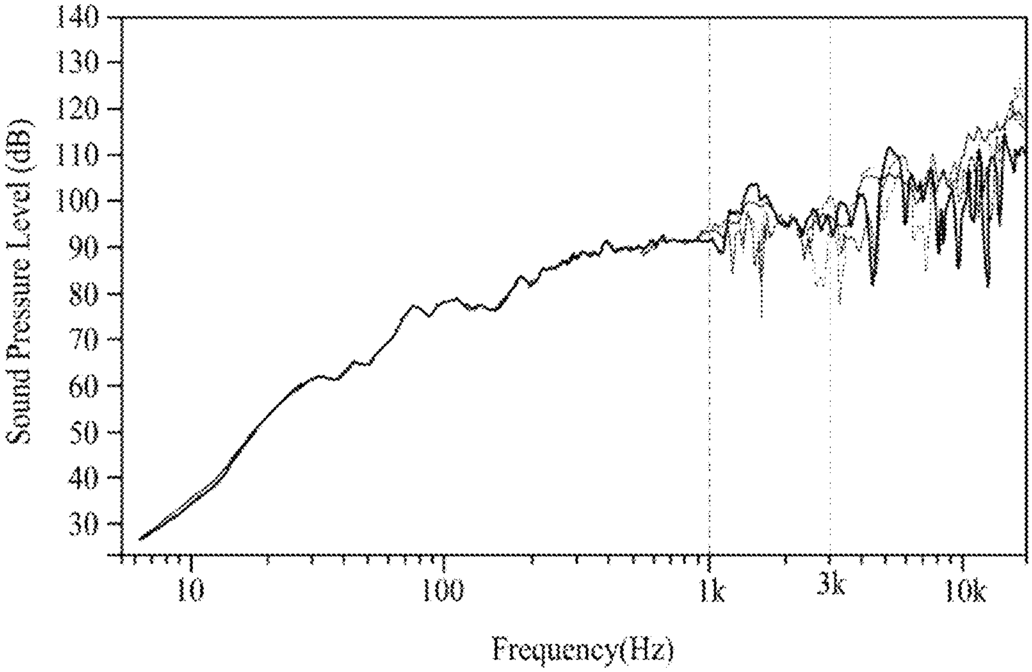
FIG. 18D illustrates a frequency-based sound pressure level with respect to each of the second horizontal region and the first and second vertical regions illustrated in FIG. 18A and a frequency-based average sound pressure level with respect to each of the first to seventh horizontal regions and the first and second vertical regions illustrated in FIG. 18A.

FIG. 18A illustrates first to seventh horizontal regions and first and second vertical regions with respect to a front surface of an apparatus according to an experimental example. FIG. 18B illustrates a frequency-based sound pressure level with respect to each of the first to fourth horizontal regions illustrated in FIG. 18A. FIG. 18C illustrates a frequency-based sound pressure level with respect to each of the second vertical region and the fifth to seventh horizontal regions illustrated in FIG. 18A. FIG. 18D illustrates a frequency-based sound pressure level with respect to each of the second horizontal region and the first and second vertical regions illustrated in FIG. 18A and a frequency-based average sound pressure level with respect to each of the first to seventh horizontal regions and the first and second vertical regions illustrated in FIG. 18A. In FIGS. 18A to 18D, the abscissa axis represents a frequency (hertz (Hz)), and the ordinate axis represents sound pressure level (SPL) (decibel (dB)).

In an experiment of the experimental example, an apparatus 10 where a plurality of holes are not formed at a supporting member overlapping with a vibration apparatus has been used, and after a laser displacement measurement apparatus apart from a vibration member of the apparatus 10 by a distance of about 2 m (meter) is placed in each of the first to seventh horizontal regions and the first and second vertical regions, the amount of displacement (or a displacement width) of a frequency-based and region-based vibration member measured by the laser displacement measurement apparatus has been converted into sound pressure level, based on a vibration of the frequency-based vibration member. In FIG. 18A, first to seventh horizontal regions H1 to H7 have been set to a horizontal 0-degree region, a horizontal 10-degree region, a horizontal 20-degree region, a horizontal 30-degree region, a horizontal −10-degree region, a horizontal −20-degree region, and a horizontal −30-degree region with respect to a front surface of the apparatus 10. A first vertical region V1 has been set to a vertical 10-degree region with respect to the front surface of the apparatus 10, and a second vertical region V2 has been set to a vertical-10-degree region with respect to the front surface of the apparatus 10.

In FIG. 18B, a thick solid line represents sound pressure level of a second horizontal region H2 corresponding to the horizontal 10-degree region, a solid line represents sound pressure level of the second horizontal region H2 corresponding to the horizontal 20-degree region, a dash-single dotted line represents sound pressure level of a third horizontal region H3 corresponding to the horizontal 30-degree region, and a dotted line represents sound pressure level of a first horizontal region H1 corresponding to the horizontal 0-degree region. As seen in FIG. 18B, comparing with the solid line, the dash-single dotted line, and the dotted line, in the thick solid line, it may be seen that sound pressure level is relatively higher in a frequency band of 1 kHz to 3 kHz. For example, in a frequency band of 1 kHz to 3 kHz, the thick solid line may have sound pressure level of about 105 dB.

In FIG. 18C, a thick solid line represents sound pressure level of the second horizontal region H2 corresponding to the horizontal 10-degree region, a solid line represents sound pressure level of a sixth horizontal region H6 corresponding to the horizontal −20-degree region, a dash-single dotted line represents sound pressure level of a fifth horizontal region H5 corresponding to the horizontal −10-degree region, and a dotted line represents sound pressure level of a seventh horizontal region H7 corresponding to the horizontal −30-degree region. As seen in FIG. 18C, comparing with the solid line, the dash-single dotted line, and the dotted line, in the thick solid line, it may be seen that sound pressure level is relatively higher in a frequency band of 1 kHz to 3 kHz.

In FIG. 18D, a thick solid line represents sound pressure level of the second horizontal region H2 corresponding to the horizontal 10-degree region, a solid line represents an average sound pressure level of the first to seventh horizontal regions and the first and second vertical regions, a dash-single dotted line represents sound pressure level of a first vertical region V1 corresponding to the vertical 10-degree region, and a dotted line represents sound pressure level of a second vertical region V2 corresponding to the vertical −10-degree region. As seen in FIG. 18D, comparing with the dash-single dotted line and the dotted line, in the thick solid line, it may be seen that sound pressure level is relatively higher in a frequency band of 1 kHz to 3 kHz. Further, comparing with the solid line, in the thick solid line, it may be seen that sound pressure level is relatively higher in a frequency band of 1 kHz to 3 kHz. For example, in a frequency band of 1 kHz to 3 kHz, the thick solid line may have sound pressure level of about 105 dB, and the solid line may have sound pressure level of about 100 dB.

As seen in FIGS. 18B to 18D, it may be seen that the horizontal 10-degree region among the first to seventh horizontal regions and the first and second vertical regions is relatively higher in degree of contribution to sound pressure level (or peak) in a frequency band of 1 kHz to 3 kHz in sound generated based on a vibration of the vibration member based on the vibration apparatus having a rectangular shape. For example, in a frequency band of 1 kHz to 3 kHz, a maximum frequency may be about 1.6 kHz in the horizontal 10-degree region, and in this case, sound pressure level may be about 105 dB.

Figure 19:
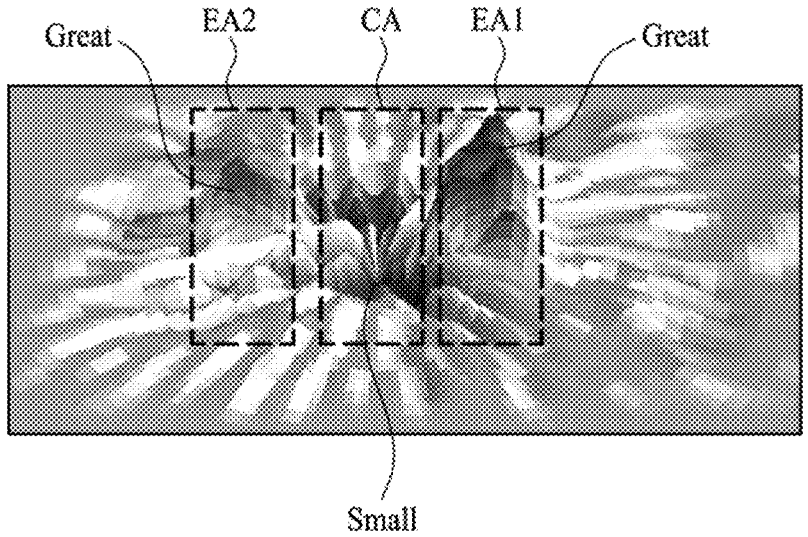
FIG. 19 illustrates a vibration mode of a vibration member in an apparatus according to an experimental example.

FIG. 19 illustrates a vibration mode (or a vibration shape) of a vibration member in an apparatus according to an experimental example. FIG. 19 illustrates the vibration mode of the vibration member based on a vibration of a vibration apparatus having a rectangular shape in the apparatus according to the experimental example.

As seen in FIG. 19, it may be seen that the amount of displacement of the vibration member corresponding to a center portion of the vibration apparatus having a rectangular shape is smaller than the amount of displacement of both periphery portions EA1 and EA2 of the vibration apparatus. Therefore, in the vibration apparatus having a rectangular shape, it may be seen that a vibration in a horizontal direction is relatively higher than a vertical direction. Accordingly, in a case which adjusts the amount of displacement of the vibration apparatus 500, the vibration mode of the vibration apparatus in the horizontal direction may be improved, and thus, the peak and/or the dip occurring in a frequency band of 1 kHz to 3 kHz of sound generated based on a vibration of the vibration member based on a vibration of the vibration apparatus having a rectangular shape may be reduced and the clarity and sharpness of sound may be improved.

Figure 20:
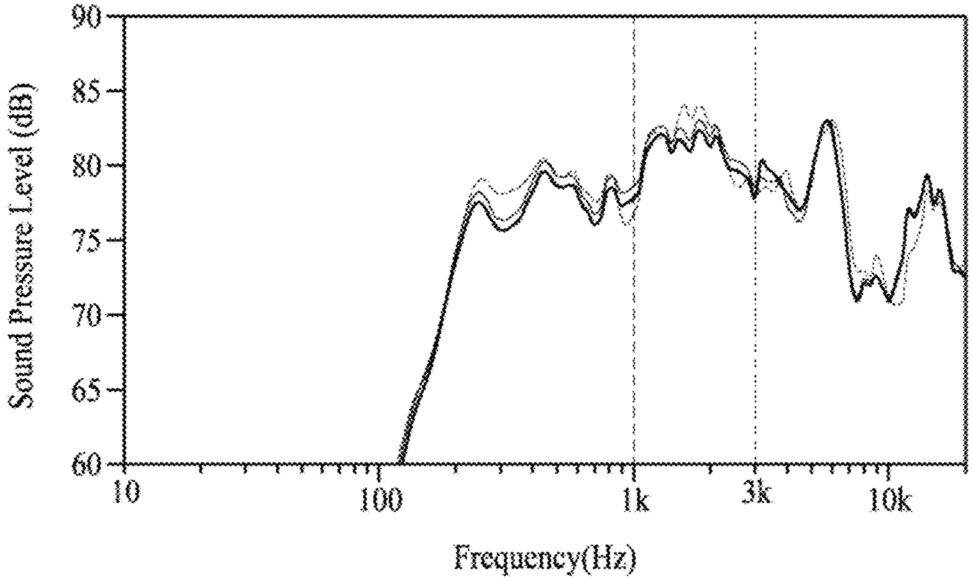
FIG. 20 illustrates sound pressure level output characteristic of an apparatus according to first to third aspects of the present disclosure.

FIG. 20 illustrates sound pressure level output characteristic of an apparatus according to first to third aspects of the present disclosure. In FIG. 20, a dotted line represents sound pressure level output characteristic of the apparatus according to the first aspect of the present disclosure, a solid line represents sound pressure level output characteristic of the apparatus according to the second aspect of the present disclosure, and a thick solid line represents sound pressure level output characteristic of the apparatus according to the third aspect of the present disclosure. In FIG. 20, the abscissa axis represents a frequency (hertz (Hz)), and the ordinate axis represents sound pressure level (SPL) (decibel (dB)).

As seen in FIG. 20, in a frequency band of 1 kHz to 3 kHz, the dotted line may have sound pressure level of about 84 dB, the solid line may have sound pressure level of about 83 dB, and the thick solid line may have sound pressure level of about 82 dB. Therefore, in a frequency band of 1 kHz to 3 kHz, it may be seen that sound pressure level of the apparatus according to the first to third aspects of the present disclosure decreases by about 16 dB to 18 dB compared to an average sound pressure level of the apparatus according to the experimental example described above with reference to FIGS. 18A to 18D and decreases by about 21 dB to 23 dB compared to sound pressure level in the horizontal 10-degree region of the apparatus according to the experimental example. Accordingly, in the apparatus according to the first to third aspects of the present disclosure, the peak and/or the dip occurring in a frequency band of 1 kHz to 3 kHz of sound generated based on a vibration of the vibration apparatus may be reduced, and thus, the clarity and sharpness of sound may be improved.

As seen in FIG. 20, comparing with the dotted line, in the solid line, it may be seen that sound pressure level decreases in a frequency band of 1 kHz to 3 kHz. Further, comparing with the dotted line, in the thick solid line, it may be seen that sound pressure level is more reduced in a frequency band of 1 kHz to 3 kHz. For example, in a frequency band of 1.5 kHz, the dotted line may have sound pressure level of about 84 dB, the solid line may have sound pressure level of about 82.5 dB, and the thick solid line may have sound pressure level of about 81.8 dB. Therefore, with respect to a frequency band of 1.5 kHz, comparing with the dotted line, in the solid line, it may be seen that a peak and/or dip phenomenon decrease (s) by about 1.5 dB. Comparing with the dotted line, in the thick solid line, it may be seen that a peak and/or dip phenomenon decrease (s) by about 2.2 dB. According to an aspect of the present disclosure, when a pad member is configured at a portion or another portion of a vibration apparatus, peak and/or dip may be more reduced in a frequency band of 1 kHz to 3 kHz of sound generated based on a vibration of the vibration apparatus, and thus, the clarity and sharpness of sound may be improved.

An apparatus according to an aspect of the present disclosure are described below.

An apparatus according to one or more aspects of the present disclosure may comprise a vibration member, a vibration apparatus configured to vibrate the vibration member, and a supporting member disposed at a rear surface side of each of the vibration member and the vibration apparatus and including a hole region overlapping with the vibration apparatus. A size of the hole region may be greater than a size of the vibration apparatus.

According to one or more aspects of the present disclosure, the vibration apparatus may comprise a first length parallel to a first direction and a second length which is parallel to a second direction and is smaller than the first length.

According to one or more aspects of the present disclosure, the supporting member may comprise a plurality of holes configured at the hole region, and the vibration apparatus may overlap with some of the plurality of holes.

According to one or more aspects of the present disclosure, a center portion of the vibration apparatus may be spaced apart from a center portion of the hole region.

According to one or more aspects of the present disclosure, the hole region may comprise a first side and a second side in the second direction, and a third side and a fourth side in the first direction. The center portion of the vibration apparatus may be disposed at a center line between the first side and the second side of the hole region and may be disposed between the fourth side and the center portion of the hole region.

According to one or more aspects of the present disclosure, the hole region may comprise a first sub-hole region overlapping with the rear surface of the vibration member at a periphery of a first side of the vibration apparatus in the first direction, and a second sub-hole region having a size being smaller than a size of the first sub-hole region and overlapping with the rear surface of the vibration member at a periphery of a second side opposite to the first side of the vibration apparatus.

According to one or more aspects of the present disclosure, the apparatus may further comprise a partition configured between the vibration member and the supporting member to surround the vibration apparatus.

According to one or more aspects of the present disclosure, the apparatus may further comprise a pad member connected to a portion of the vibration apparatus.

An apparatus according to one or more aspects of the present disclosure may comprise a vibration member including a first region and a second region, a vibration apparatus including a first vibration apparatus configured to vibrate the first region and a second vibration apparatus configured to vibrate the second region, and a supporting member disposed at a rear surface side of each of the vibration member and the vibration apparatus and including a hole region overlapping with the vibration apparatus. The hole region may comprise a first hole region having a size being greater than a size of the first vibration apparatus, and a second hole region having a size being greater than a size of the second vibration apparatus.

According to one or more aspects of the present disclosure, each of the first vibration apparatus and the second vibration apparatus may comprise a first length parallel to the first direction and a second length being parallel to the second direction and is smaller than the first length.

According to one or more aspects of the present disclosure, a center portion of the first vibration apparatus may be spaced apart from a center portion of the first hole region. A center portion of the second vibration apparatus may be spaced apart from a center portion of the second hole region.

According to one or more aspects of the present disclosure, the apparatus may further comprise a partition configured between the vibration member and the supporting member to surround the vibration apparatus.

According to one or more aspects of the present disclosure, the partition may comprise a first partition member and a second partition member parallel to each other with the first vibration apparatus and the second vibration apparatus therebetween, a third partition member between the first vibration apparatus and the second vibration apparatus and between the first partition member and the second partition member, a fourth partition member between the first partition member and the second partition member in parallel with the third partition member with the first vibration apparatus therebetween, and a fifth partition member between the first partition member and the second partition member with the second vibration apparatus therebetween in parallel with the third partition member.

According to one or more aspects of the present disclosure, one side of each of the first partition member and the second partition member may protrude from the fourth partition member, and the other side of each of the first partition member and the second partition member may protrude from the fifth partition member.

According to one or more aspects of the present disclosure, the apparatus may further comprise a pad member connected to a portion of the vibration apparatus.

According to one or more aspects of the present disclosure, the pad member may be connected to the rear surface of the vibration member to intersect with the vibration apparatus.

According to one or more aspects of the present disclosure, the pad member may be s spaced apart from the hole region.

According to one or more aspects of the present disclosure, the pad member may be spaced apart from a center portion of the vibration apparatus.

According to one or more aspects of the present disclosure, the pad member may comprise a single-sided tape, a single-sided foam tape, a single-sided cushion tape, a single-sided sponge tape, a single-sided adhesive pad, a single-sided adhesive foam tape, or a single-sided adhesive cushion pad.

According to one or more aspects of the present disclosure, the pad member may comprise a first pad portion and a second pad portion connected to the rear surface of the vibration member with the vibration apparatus therebetween, and a third pad portion connected between the first pad portion and the second pad portion and connected to the rear surface of the vibration apparatus.

According to one or more aspects of the present disclosure, the pad member may further comprise a first pad member connected to a portion of the first vibration apparatus, and a second pad member connected to a portion of the second vibration apparatus.

According to one or more aspects of the present disclosure, the first pad member may be connected to the rear surface of the vibration member to intersect with the portion, which is spaced apart from a center portion, of the first vibration apparatus. The second pad member may be connected to the rear surface of the vibration member to intersect with the portion, which is spaced apart from a center portion, of the second vibration apparatus.

According to one or more aspects of the present disclosure, the portion of the first pad member may be between a center portion of the first vibration apparatus and a center portion the vibration member. A portion of the second pad member may be between the center portion of the second vibration apparatus and a lateral surface of the vibration member.

According to one or more aspects of the present disclosure, the apparatus may further comprise a third pad member connected to another portion of the first vibration apparatus with a center portion of the first vibration apparatus therebetween in parallel with the first pad member, and a fourth pad member connected to another portion of the second vibration apparatus with a center portion of the second vibration apparatus therebetween in parallel with the second pad member.

According to one or more aspects of the present disclosure, the vibration apparatus may comprise a vibration generating part, and the vibration generating part may comprise a first cover member, the second cover member, and a vibration part between the first cover member and the second cover member, the vibration part including a piezoelectric material.

According to one or more aspects of the present disclosure, the vibration part may include a plurality of first portions and one or more second portions between the plurality of first portions, each of the plurality of first portions may include at least one or more of a piezoelectric inorganic material and a piezoelectric organic material, and the one or more second portions may include an organic material.

According to one or more aspects of the present disclosure, the vibration generating part may further comprise a signal supply member electrically connected to the vibration part.

According to one or more aspects of the present disclosure, a portion of the signal supply member may be accommodated between the first cover member and the second cover member.

According to one or more aspects of the present disclosure, the vibration apparatus may comprise a plurality of vibration generators and an adhesive member between the plurality of vibration generators.

According to one or more aspects of the present disclosure, the vibration member may comprise a display panel including a pixel configured to display an image.

According to one or more aspects of the present disclosure, the vibration member may comprise one or more materials of metal, plastic, fiber, leather, wood, cloth, rubber, carbon, glass, and paper.

A vibration apparatus according to one or more aspects of the present disclosure may be applied to or included in a vibration apparatus which is disposed in an apparatus. The apparatus according to one or more aspects of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Moreover, the vibration apparatus according to one or more aspects of the present disclosure may be applied to or included in an organic light-emitting lighting apparatus or an inorganic light-emitting lighting apparatus. When the vibration apparatus is applied to or included in the lighting apparatuses, the lighting apparatuses may act as lighting and a speaker. In addition, when the vibration apparatus according to one or more aspects of the present disclosure is applied to or included in the mobile apparatuses or the like, the vibration apparatus may be one or more of a speaker, a receiver, and a haptic device, but aspects of the present disclosure are not limited thereto.

It will be apparent to those skilled in the art that various modifications and variations may be made in the present disclosure without departing from the scope of the disclosures. Thus, it is intended that the present disclosure covers the modifications and variations of this disclosure provided they come within the scope of the appended claims and their equivalents.

What is claimed is:

1. An apparatus, comprising:

a vibration member;

a vibration apparatus configured to vibrate the vibration member; and a supporting member disposed in a rearward direction surface side of from each of the vibration member and the vibration apparatus and spaced apart from the vibration member and the vibration apparatus in the rearward direction, the supporting member including a hole region overlapping with the vibration apparatus, wherein a size of the hole region is greater than a size of the vibration apparatus, and wherein a center portion of the vibration apparatus is spaced apart from a center portion of the hole region in a second direction which is perpendicular to the rearward direction.

2. The apparatus of claim 1, wherein the vibration apparatus comprises a first length parallel to a first direction and a second length being parallel to the second direction and is smaller than the first length.

3. The apparatus of claim 2, wherein the supporting member comprises a plurality of holes configured at the hole region, and wherein the vibration apparatus overlaps with some of the plurality of holes.

4. The apparatus of claim 3, wherein the hole region comprises a first side and a second side in the second direction, and a third side and a fourth side in the first direction, and wherein the center portion of the vibration apparatus is disposed at a center line between the first side and the second side of the hole region and is disposed between the fourth side and the center portion of the hole region.

5. The apparatus of claim 3, wherein the hole region comprises:

a first sub-hole region overlapping with the rear surface of the vibration member at a periphery of a first side of the vibration apparatus in the first direction; and a second sub-hole region having a size being smaller than a size of the first sub-hole region and overlapping with the rear surface of the vibration member at a periphery of a second side opposite to the first side of the vibration apparatus.

6. The apparatus of claim 1, further comprising a partition configured between the vibration member and the supporting member to surround the vibration apparatus.

7. The apparatus of claim 1, further comprising a pad member connected to a portion of the vibration apparatus.

8. The apparatus of claim 7, wherein the pad member is connected to the rear surface of the vibration member to intersect with the vibration apparatus.

9. The apparatus of claim 8, wherein the pad member is spaced apart from the hole region.

10. The apparatus of claim 8, wherein the pad member is spaced apart from a center portion of the vibration apparatus.

11. The apparatus of claim 8, wherein the pad member comprises a single-sided tape, a single-sided foam tape, a single-sided cushion tape, a single-sided sponge tape, a single-sided adhesive pad, a single-sided adhesive foam tape, or a single-sided adhesive cushion pad.

12. The apparatus of claim 8, wherein the pad member comprises:

a first pad portion and a second pad portion connected to the rear surface of the vibration member with the vibration apparatus therebetween; and a third pad portion connected between the first pad portion and the second pad portion and connected to the rear surface of the vibration apparatus.

13. The apparatus of claim 1, wherein the vibration apparatus comprises a vibration generating part, and wherein the vibration generating part comprises:

a first cover member;

a second cover member; and a vibration part between the first cover member and the second cover member, the vibration part including a piezoelectric material.

14. The apparatus of claim 13, wherein the vibration part includes a plurality of first portions and one or more second portions between the plurality of first portions, wherein each of the plurality of first portions includes at least one or more of a piezoelectric inorganic material and a piezoelectric organic material, and wherein the one or more second portions include an organic material.

15. The apparatus of claim 13, wherein the vibration generating part further comprises a signal supply member electrically connected to the vibration part, and wherein a portion of the signal supply member is accommodated between the first cover member and the second cover member.

16. The apparatus of claim 1, wherein the vibration apparatus comprises a plurality of vibration generators and an adhesive member between the plurality of vibration generators.

17. The apparatus of claim 1, wherein the vibration member comprises a display panel including a pixel configured to display an image.

18. The apparatus of claim 1, wherein the vibration member comprises one or more materials of metal, plastic, fiber, leather, wood, cloth, rubber, carbon, glass, and paper.

19. An apparatus, comprising:

a vibration member including a first region and a second region;

a vibration apparatus including a first vibration apparatus configured to vibrate the first region and a second vibration apparatus configured to vibrate the second region; and a supporting member disposed in a rearward direction from each of the vibration member and the vibration apparatus and spaced apart from the vibration member and the vibration apparatus in the rearward direction, the supporting member including a hole region overlapping with the vibration apparatus, wherein the hole region comprises:

a first hole region having a size being greater than a size of the first vibration apparatus; and a second hole region having a size being greater than a size of the second vibration apparatus, wherein a center portion of the first vibration apparatus is spaced apart from a center portion of the first hole region in a second direction which is perpendicular to the rearward direction, and wherein a center portion of the second vibration apparatus is spaced apart from a center portion of the second hole region in the second direction which is perpendicular to the rearward direction.

20. The apparatus of claim 19, wherein each of the first vibration apparatus and the second vibration apparatus comprises a first length parallel to a first direction and a second length being parallel to the second direction and is smaller than the first length.

21. The apparatus of claim 19, further comprising a partition configured between the vibration member and the supporting member to surround the vibration apparatus.

22. The apparatus of claim 21, wherein the partition comprises:

a first partition member and a second partition member parallel to each other with the first vibration apparatus and the second vibration apparatus therebetween;

a third partition member between the first vibration apparatus and the second vibration apparatus and between the first partition member and the second partition member;

a fourth partition member between the first partition member and the second partition member in parallel with the third partition member with the first vibration apparatus therebetween; and a fifth partition member between the first partition member and the second partition member with the second vibration apparatus therebetween in parallel with the third partition member.

23. The apparatus of claim 22, wherein one side of each of the first partition member and the second partition member protrudes from the fourth partition member, and wherein the other side of each of the first partition member and the second partition member protrudes from the fifth partition member.

24. The apparatus of claim 19, further comprising a pad member connected to a portion of the vibration apparatus.

25. The apparatus of claim 24, wherein the pad member further comprises:

a first pad member connected to a portion of the first vibration apparatus; and a second pad member connected to a portion of the second vibration apparatus.

26. The apparatus of claim 25, wherein the first pad member is connected to the rear surface of the vibration member to intersect with the portion, which is spaced apart from the center portion of the first vibration apparatus, and wherein the second pad member is connected to the rear surface of the vibration member to intersect with the portion, which is spaced apart from the center portion of the second vibration apparatus.

27. The apparatus of claim 25, wherein the portion of the first pad member is between the center portion of the first vibration apparatus and a center portion the vibration member, and wherein a portion of the second pad member is between the center portion of the second vibration apparatus and a lateral surface of the vibration member.

28. The apparatus of claim 25, further comprising:

a third pad member connected to another portion of the first vibration apparatus with the center portion of the first vibration apparatus therebetween in parallel with the first pad member; and a fourth pad member connected to another portion of the second vibration apparatus with the center portion of the second vibration apparatus therebetween in parallel with the second pad member.

* * * * *